(12) United States Patent
Takano et al.

(10) Patent No.: US 8,139,757 B2
(45) Date of Patent: Mar. 20, 2012

(54) ELECTRONIC DEVICE CAPABLE OF RECORDING CONFERENCE INFORMATION, COMPUTER SYSTEM, CONFERENCE INFORMATION PROCESSING METHOD, AND PROGRAM PRODUCT THEREFOR

(75) Inventors: Kentaro Takano, Tokyo (JP); Tohru Fuse, Tokyo (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1601 days.

(21) Appl. No.: 11/514,197

(22) Filed: Sep. 1, 2006

(65) Prior Publication Data
US 2007/0203981 A1    Aug. 30, 2007

(30) Foreign Application Priority Data
Feb. 10, 2006 (JP) .................................. 2006-034588

(51) Int. Cl.
*H04M 3/00* (2006.01)

(52) U.S. Cl. .............................. 379/266.07; 379/266.01

(58) Field of Classification Search ... 379/266.01–266.1
See application file for complete search history.

(56) References Cited

U.S. PATENT DOCUMENTS

| | | | |
|---|---|---|---|
| 6,188,831 B1 * | 2/2001 | Ichimura | 386/241 |
| 6,304,283 B1 * | 10/2001 | Kitagawa | 348/14.06 |
| 6,671,875 B1 * | 12/2003 | Lindsey et al. | 717/129 |
| 7,707,227 B2 * | 4/2010 | Shibata | 707/802 |
| 2003/0179860 A1 * | 9/2003 | Sun et al. | 379/67.1 |
| 2010/0138520 A1 * | 6/2010 | Gallant | 709/220 |

FOREIGN PATENT DOCUMENTS
JP    A 2004-227514    8/2004

* cited by examiner

*Primary Examiner* — William Deane, Jr.
(74) *Attorney, Agent, or Firm* — Oliff & Berridge, PLC

(57) ABSTRACT

An electronic device that is connected to an external interface of a computer and has a memory unit that stores a program to be executed by the computer and data. The program includes a first operating unit that causes the computer to perform an operation of acquiring conference information containing at least one of image data and audio data as to a conference and storing the conference information in a predetermined memory area.

13 Claims, 38 Drawing Sheets

1. CAPTURE PROGRAM IS AUTOMATICALLY ACTIVATED WHEN USB MEMORY IS INSERTED TO COMPUTER 100, AND CAPTURING OPERATION IS STARTED

2. CAPTURE PROGRAM IS AUTOMATICALLY ACTIVATED WHEN USB MEMORY IS INSERTED TO COMPUTER 100, AND CAPTURING OPERATION IS STARTED BY A USER SELECTING "START CAPTURE"

FIG. 13

120 COMPARISON WITH STATIC PC PERFORMANCE

| SCREEN RESOLUTION | CPU | MEMORY | RECOMMENDED AUDIO SAMPLING RATE | RECOMMENDED IMAGE SAMPLING RATE |
|---|---|---|---|---|
| ... | ... | ... | ... | ... |
| ... | ... | ... | ... | ... |
| ... | ... | ... | ... | ... |

122 COMPARISON WITH DYNAMIC PC USAGE RATES

| SCREEN RESOLUTION | CPU | MEMORY | CPU USAGE RATE | MEMORY USAGE RATE | RECOMMENDED AUDIO SAMPLING RATE | RECOMMENDED IMAGE SAMPLING RATE |
|---|---|---|---|---|---|---|
| ... | ... | ... | ...% | ...% | ... | ... |
| ... | ... | ... | ...% | ...% | ... | ... |
| ... | ... | ... | ...% | ...% | ... | ... |

10 USB MEMORY

RECORD EACH IMAGE FILE ASSOCIATED WITH ONE AUDIO FILE

RECORD IMAGE FILES ASSOCIATED WITH ONE AUDIO FILE AND TIME STAMP

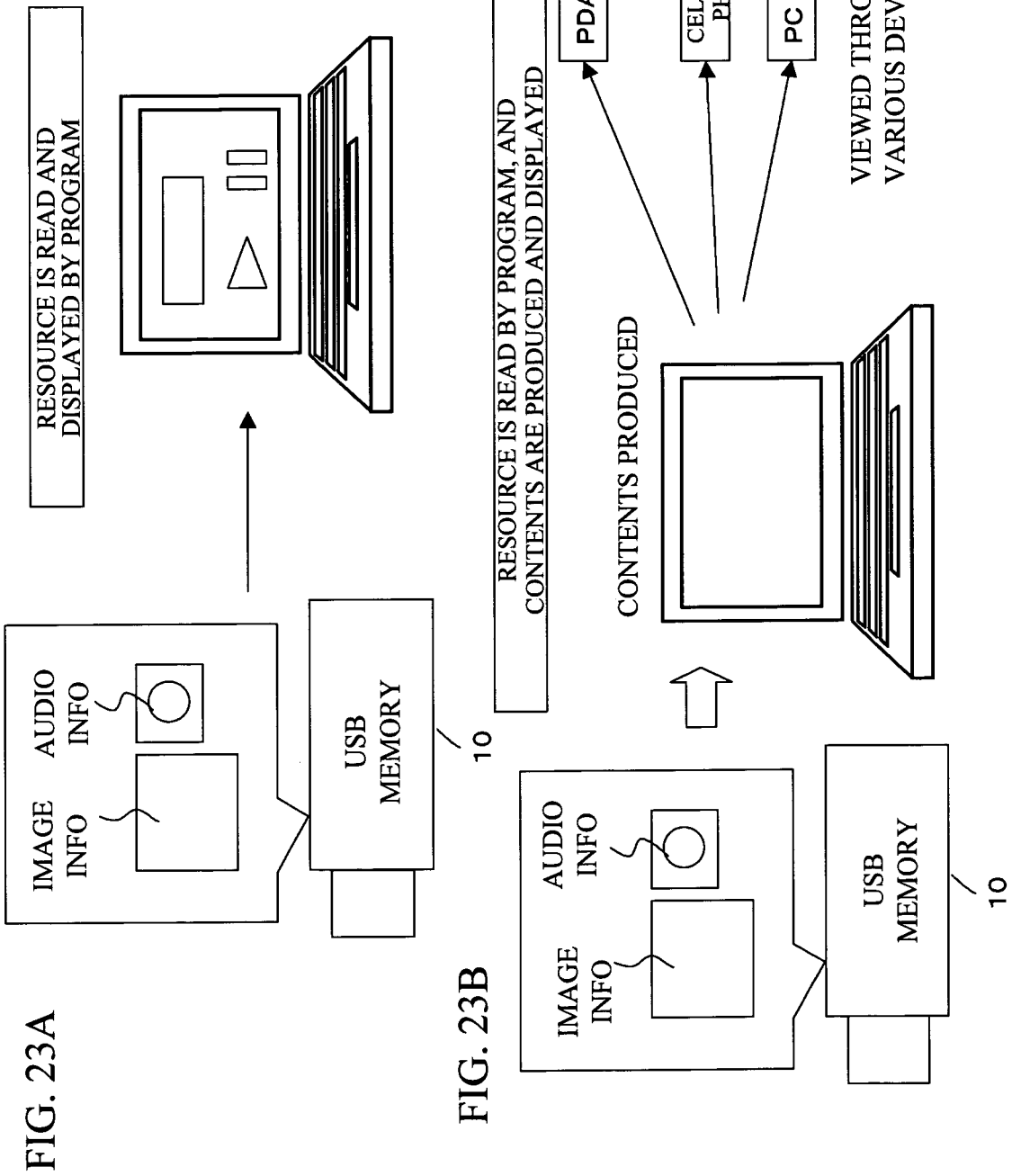

FIG. 24

| SCREEN RESOLUTION OF PC TO WHICH USB MEMORY IS INSERTED | MINIMUM POINT OF CHARACTERS CONTAINED IN DOCUMENT | FONT TYPE OF THE CHARACTERS | DISPLAY MAGNIFICATION |
|---|---|---|---|
| ...... | ...... | ...... | ...... |
| ...... | ...... | ...... | ...... |
| ...... | ...... | ...... | ...... |

130

| SCREEN RESOLUTION OF PC TO WHICH USB MEMORY IS INSERTED | POINT EQUIVALENT TO MEDIAN VALUE AMONG CHARACTERS CONTAINED IN DOCUMENT | FONT TYPE MOST FREQUENTLY OBSERVED IN CHARACTERS OF MEDIAN VALUE | DISPLAY MAGNIFICATION |
|---|---|---|---|
| ...... | ...... | ...... | ...... |
| ...... | ...... | ...... | ...... |
| ...... | ...... | ...... | ...... |

132

| SCREEN RESOLUTION OF PC TO WHICH USB MEMORY IS INSERTED | POINT EQUIVALENT TO AVERAGE VALUE AMONG CHARACTERS CONTAINED IN DOCUMENT | FONT TYPE MOST FREQUENTLY OBSERVED IN CHARACTERS OF AVERAGE VALUE | DISPLAY MAGNIFICATION |
|---|---|---|---|
| ...... | ...... | ...... | ...... |
| ...... | ...... | ...... | ...... |
| ...... | ...... | ...... | ...... |

134

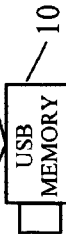

USB MEMORY — 10

$\overline{a}_{n+1}$ : PARAMETER CHANGED WHEN THE (N+1)-TH SET OF DATA IS PROVIDED $a_{n+1}$ : (N+1)-TH DATA $$\overline{a}_{n+1} = (\overline{a}_n * n + a_{n+1})/(n+1) \quad \text{or} \quad \overline{a}_{n+1} = a_{n+1}$$

US 8,139,757 B2

ELECTRONIC DEVICE CAPABLE OF RECORDING CONFERENCE INFORMATION, COMPUTER SYSTEM, CONFERENCE INFORMATION PROCESSING METHOD, AND PROGRAM PRODUCT THEREFOR

BACKGROUND

1. Technical Field

The present invention generally relates to an electronic device that is capable of storing conference information, and more particularly, to an electronic device that involves a detachable memory device and has functions of acquiring (capturing) conference information such as images and audio information and storing the conference information therein in accordance with a program installed in the memory device.

2. Related Art

There has been a technique by which conference information such as images and sounds of a conference is captured through a camera or a microphone and is stored in a memory. By such a technique, the conference information is read from the memory so that the conference is reproduced. There has also been a technique by which an application for presentations is activated to capture a displayed image in accordance with a user operation, and the captured image is stored as conference information in a memory.

SUMMARY

An aspect of the present invention provides an electronic device that is connected to an external interface of a computer and has a memory unit that stores a program to be executed by the computer and data, the program including: a first operating unit that causes the computer to perform an operation of acquiring conference information containing at least one of image data and audio data as to a conference and storing the conference information in a predetermined memory area.

BRIEF DESCRIPTION OF THE DRAWINGS

FIG. 13 shows specific examples of sampling rate changes;

FIGS. 23A and 23B schematically illustrate the functions of the view unit;

FIG. 24 shows three display magnification tables stored in the data region of the USB memory;

DETAILED DESCRIPTION

The following is a description of preferred embodiments of the present invention, with reference to the accompanying drawings.

Figure 1:
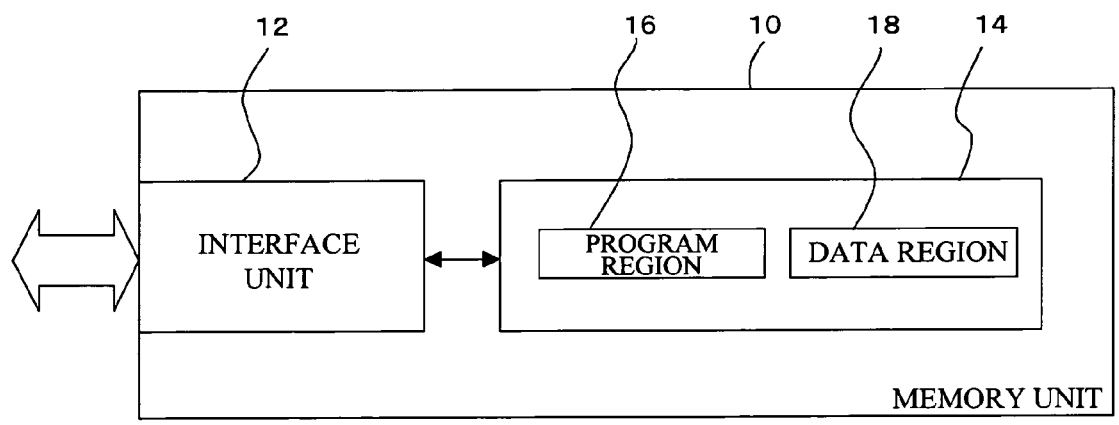
FIG. 1 is a block diagram of an electronic device in accordance with an embodiment of the present invention.

FIG. 1 is a block diagram of an electronic device in accordance with an embodiment of the present invention. An electronic device 10 is a detachable memory, such as a USB memory. Hereinafter, the electronic device 10 will be referred to as the USB memory 10. The USB memory 10 includes an interface unit 12 and a memory unit 14. The memory unit 14 as a memory area includes a program region 16 and a data region 18. If the memory area of the memory unit 14 is not divided into the program region 16 and the data region 18 in terms of hardware, the region of memory area storing programs serves as the program region 16, while the region storing data serves as the data region 18. The interface unit 12 forms an interface with an external device such as a computer, which is a general configuration employed in a USB memory. For example, the interface unit 12 includes a USB controller (hardware), and software for performing initialization, connection, transfer, and disconnection.

The program region 16 stores a program for realizing first through sixth operating units. The first operating unit causes a computer to acquire conference information containing at least either image data or audio data of the subject conference and perform operations stored in the data region 18 or in a memory area outside the USB memory 10 (referred to collectively as the predetermined memory area). For example, the first operating unit stores the image data associated with the audio data, together with time stamp information, in the data region 18 or the memory area other than the USB memory 10. The second operating unit causes the computer to display the conference information stored in the data region 18 or the memory area outside the USB memory 10. The third operating unit causes the computer to generate conference minutes information that forms conference minutes based on the conference information and store the conference minutes information in the data region 18 or the memory area other than the USB memory 10. The fourth operating unit causes the computer to perform an operation to transmit at least either the conference information or the conference minutes information to the outside, which is the computer connected to the USB memory 10. The fifth operating unit acquires the information as to at least either the capacity or the operation status of the computer connected to the USB memory 10, and stores the information in the data region 18 or the memory area outside the USB memory 10. Based on the information, the fifth operating unit causes the computer to perform an operation of controlling at least one of the first through fourth operating units, so that a load can be applied in accordance with the capacity and the operation status of the computer. The sixth operating unit refers to the environment information of each user stored in the data region 18, and causes the computer to perform an operation of controlling at least one of the first through fourth operating units in accordance with the environment information.

The memory area outside the USB memory 10 may be a computer to which the USB memory 10 is connected, or a certain drive (a memory such as a detachable hard disk, a DVD, or a Compact Flash (a registered trade name)).

The fifth operating unit can be designed to acquire the information as to at least either the capacity or the operation status of the computer connected to the USB memory 10, and store the information in the data region 18 in the memory area or the memory area outside the USB memory 10.

The information as to at least either the capacity or the operation status of the computer connected to the USB memory 10 may be the information as to either the capacity and the usage status of the central processing unit in the computer or the usage status of the predetermined memory area, which is the memory unit 14 or the memory area outside the USB memory 10.

The fifth operating unit refers to at least either the sampling rate at which the conference information stored in the data region 18 is acquired or the parameter relating to the conference information display, and then acquires the information as to at least either the capacity or the operation status of the computer connected to the USB memory 10. The fifth operating unit compares the information with the sampling rate stored in the data region 18 and the parameter, and may change at least either the sampling rate at which the conference information is acquired or the parameter relating to the conference information display.

The sixth operating unit compares the environment information of each user designated by an outsider with at least either the sampling rate at which the conference information stored in the data region 18 or the memory area outside the USB memory 10 is acquired or the parameter relating to the conference information display as the environment information of each user. In accordance with the comparison result, the sixth operating unit may change at least either the sampling rate at which the conference information is acquired or the parameter relating to the conference information display.

The sixth operating unit may be designed to compare the environment information of each user with at least either the sampling rate at which the conference information stored in the data region 18 or the memory area outside the USB memory 10 is acquired or the parameter relating to the conference information display as the environment information of each user. In accordance with the comparison result, the sixth operating unit may change at least either the sampling rate at which the conference information is acquired or the parameter relating to the conference information display.

Figure 2:
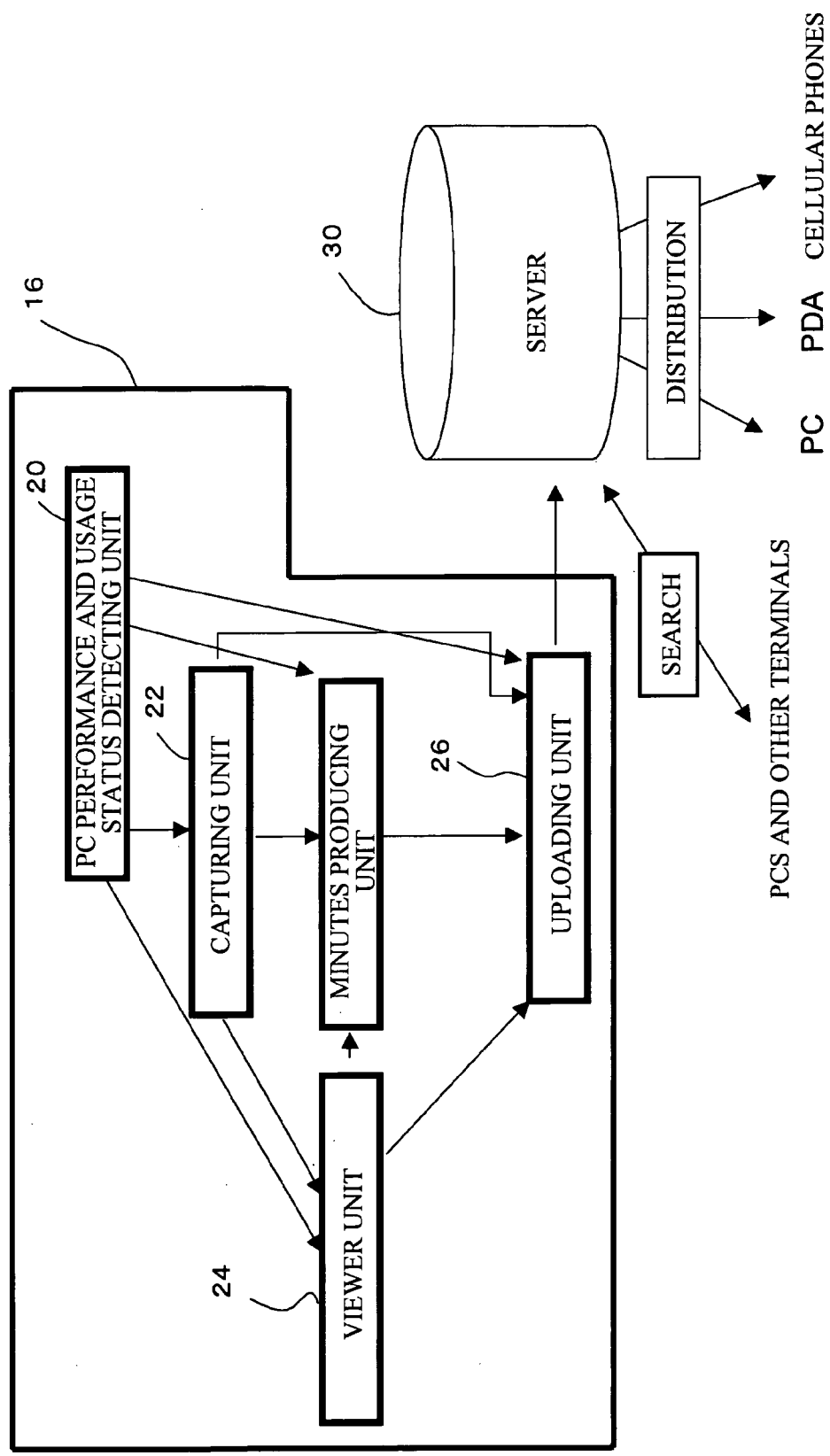
FIG. 2 illustrates the structure of a program stored in the program region in the USB memory, which is the electronic device shown in FIG. 1.

FIG. 2 illustrates the structure of the program stored in the program region. This program functions as a PC performance and usage status detecting unit 20, a capturing unit 22, a viewer unit 24, a minutes producing unit 26, and an uploading unit 28. The first operating unit is equivalent to the capturing unit 22. The second operating unit is equivalent to the viewer unit 24. The third operating unit is equivalent to the minutes producing unit 26. The fourth operating unit is equivalent to the uploading unit 28. The fifth operating unit and the sixth operating unit are equivalent to the PC performance and usage status detecting unit 20. A server 30 shown in FIG. 2 is a computer to which the USB memory 10 is connected via a computer, or a computer to which the USB memory 10 is connected directly. The server 30 functions to perform searching as described later, and distribute information to computers such as PCs and PDAs and cellular phones.

Figure 3:
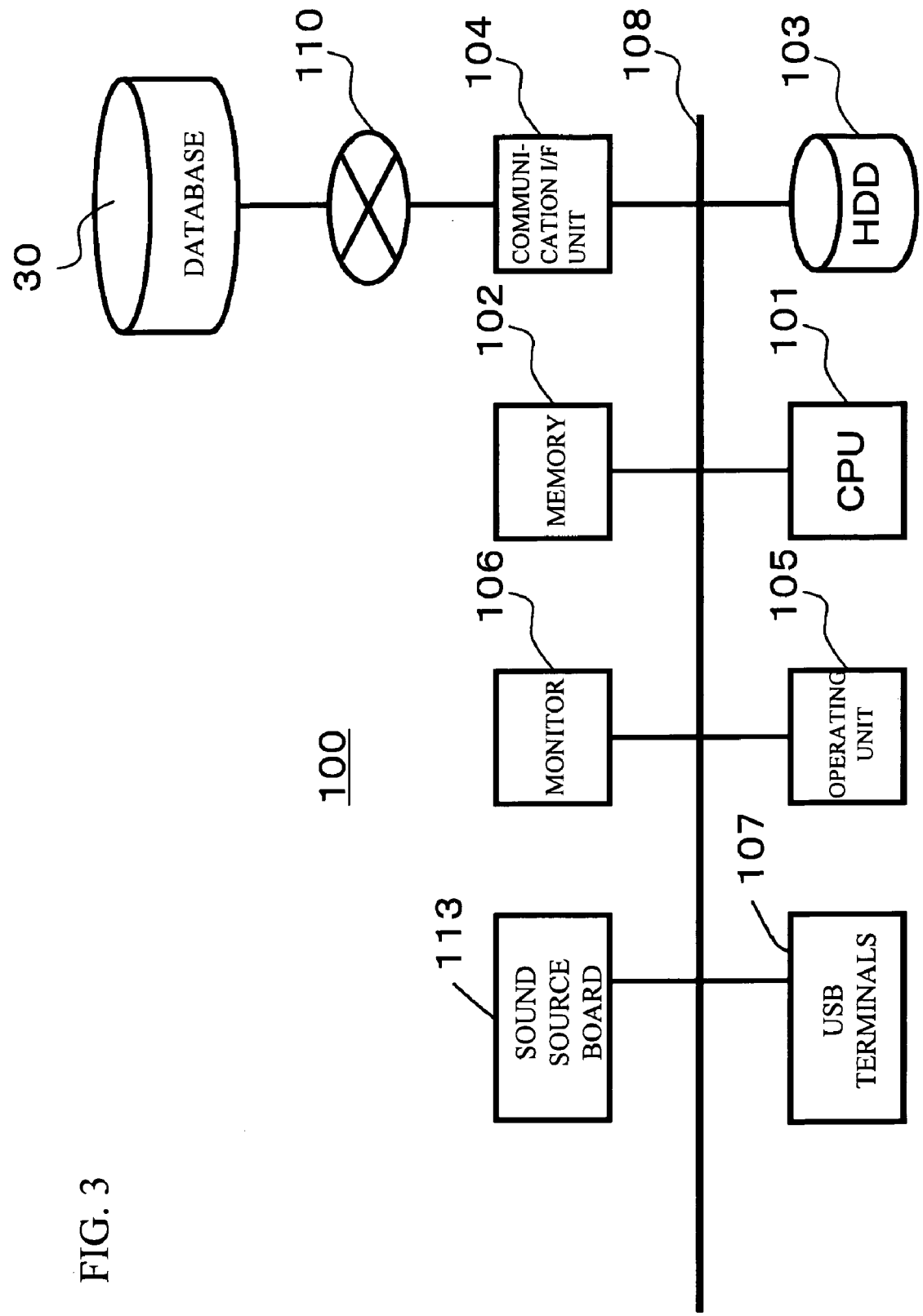
FIG. 3 is a block diagram showing an example hardware structure of a computer to which the USB memory is connected.

The USB memory 10 shown in FIGS. 1 and 2 is connected to a computer 100 shown in FIG. 3. This computer 100 (hereinafter also referred to as the PC 100) executes the program of each unit shown in FIG. 2, so that the first through sixth operating units are realized. The computer 100 includes a CPU 101, a memory 102, a HDD 103, a communication interface (I/F) unit 104, an operation unit 105 such as a mouse and a keyboard, a monitor 106, USB terminals 107 constituting an external interface, a sound source 113, and a bus 108. The USB memory 10 is inserted to the USB terminals 107. The computer 100 is connected to a network 110 via the communication I/F unit 104, so that data exchange with the server 30 connected to the network 110 can be performed. The computer 100 can of course communicate with any computer connected to the network 110.

Figure 4:
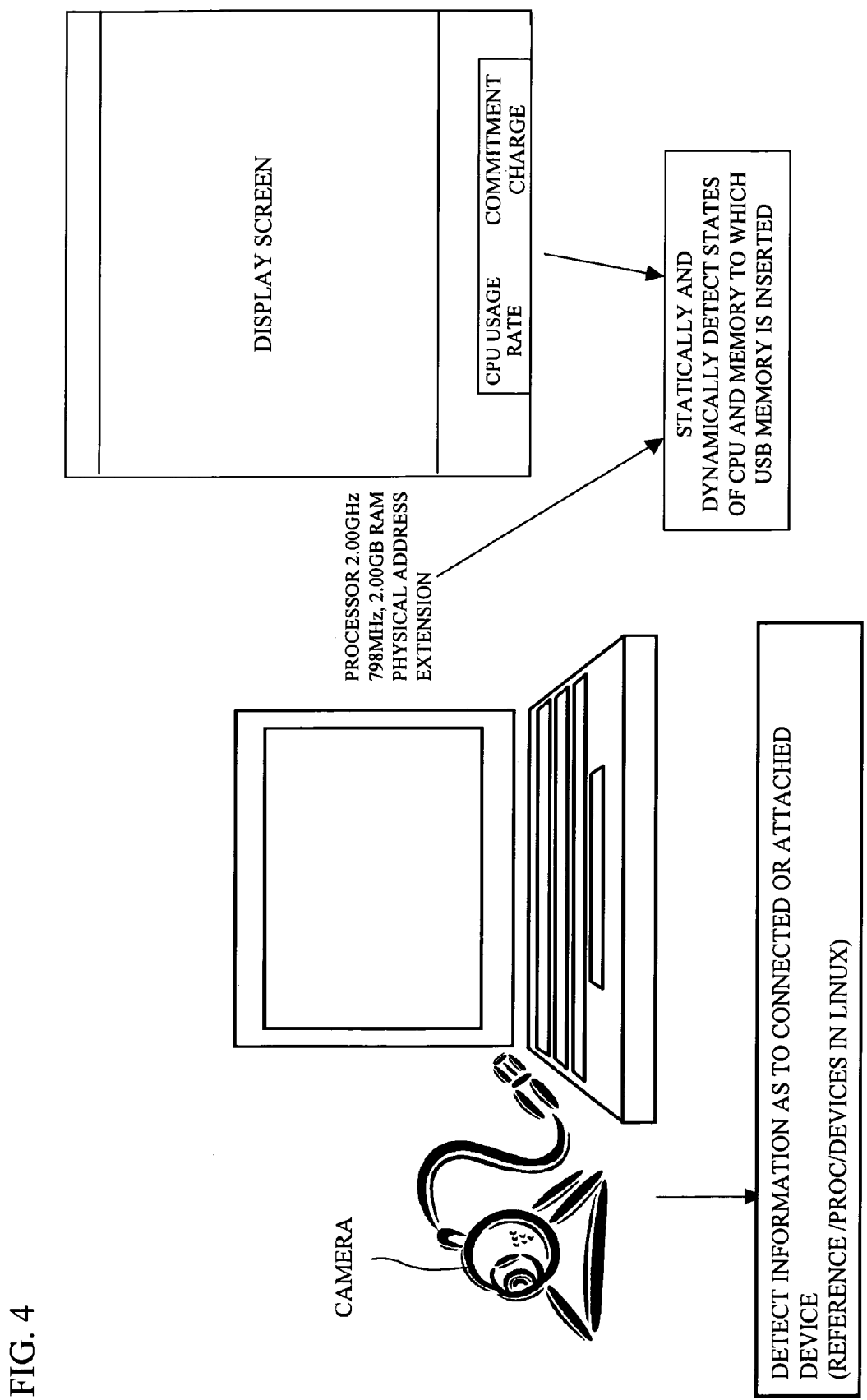
FIG. 4 schematically shows the functions of the PC performance and usage status detecting unit.

Next, the units 20 through 28 shown in FIG. 2 are described. As the USB memory 10 is inserted to the USB terminals 107 of the computer 100, the PC performance and usage status detecting unit 20 is automatically activated by a known auto-run function. The program is executed by the CPU 101 shown in FIG. 3, so that the function shown in FIG. 4, for example, is realized. The PC performance and usage status detecting unit 20 functions to detect the information as to a device connected to the computer 100 (a camera in the example case shown in FIG. 4) or the information as to a device attached to the computer 100. The PC performance and usage status detecting unit 20 also functions to detect statically or dynamically the states of the CPU 101 and the memory 102. In the example case shown in FIG. 4, the static device information includes the information as to the camera, the operating frequency of the CPU, and the operating frequency and the capacity of the internal memory. The dynamic device information includes the CPU usage rate and the commitment charge.

Figure 5:
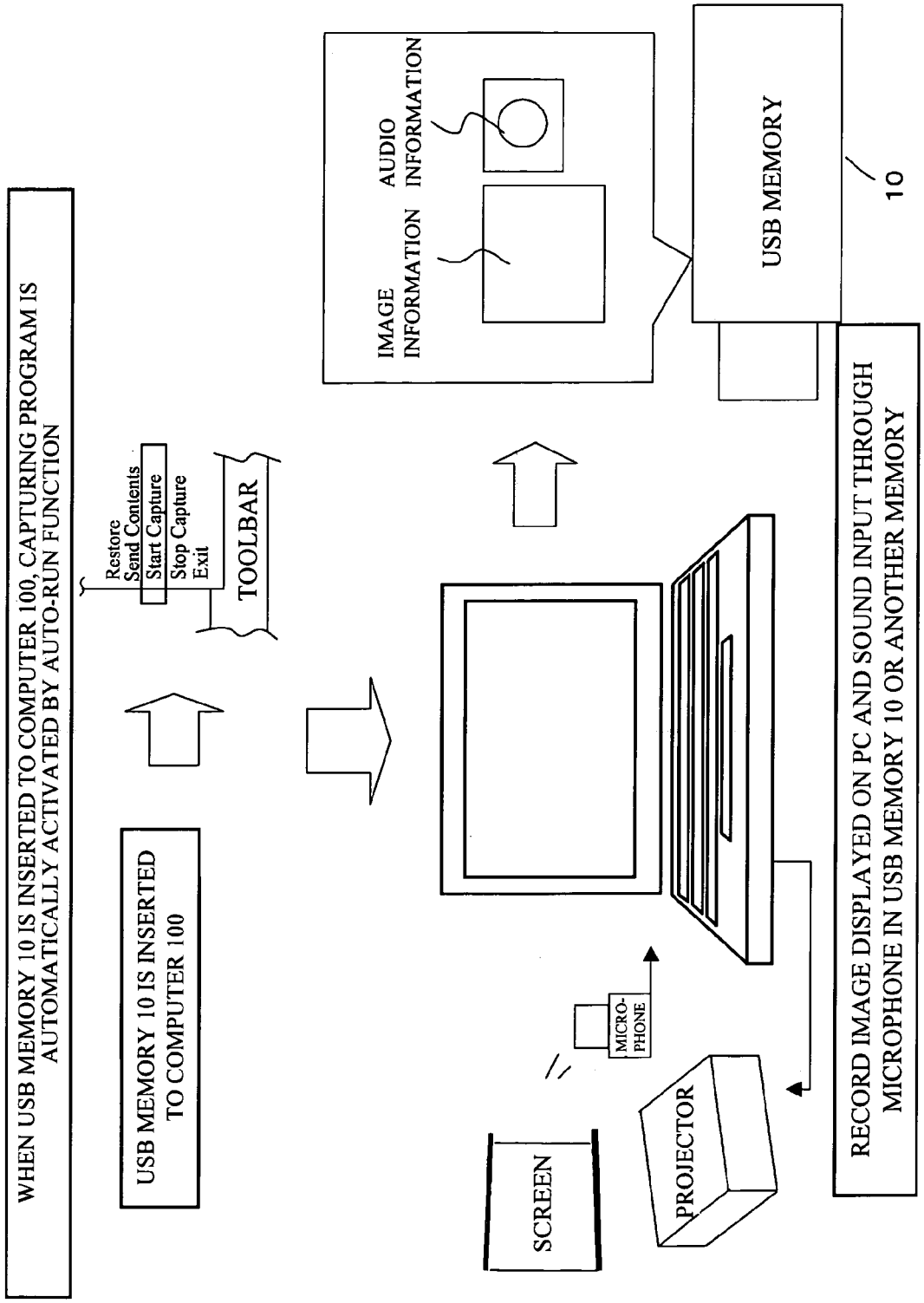
FIG. 5 schematically shows the functions of the capturing unit.

As shown in FIG. 5, the capturing unit 22 is automatically activated by the auto-run function, or is activated by an activation instruction issued from the user using the operating unit 105 shown in FIG. 3. The capturing unit 22 captures the image shown on the monitor 106 of the computer 100 and the sound input via a microphone connected to the USB terminals 107. The capturing unit 22 then stores the image information and the audio information as the conference information in the data region 18 of the USB memory 10 shown in FIG. 1. Instead of the data region 18, the conference information may be stored in the other memory area connected to the computer 100. For example, the information may be stored in a hard disk in the computer 100, an electronic device containing a detachable recording medium such as a DVD, a detachable hard disk drive, or a detachable compact disk, or the server 30. Reference numeral 114 in FIG. 14 indicates a projector connected to the computer 100. The projector projects an image (or slide) of the application for presentation used in the computer 100 on a screen 116. Although not shown in FIG. 5, the camera shown in FIG. 4 may be connected to the computer 100, so that the conference is captured by the camera and the captured information is stored as the conference information in the data region 18. The timing of capture may be the same as the timing of the operator operating the computer 100 during the presentation or may be in accordance with constant cycles. Alternatively, the timing of capture may be the same as the timing of capture of a certain key operation performed by a user.

Figure 6:
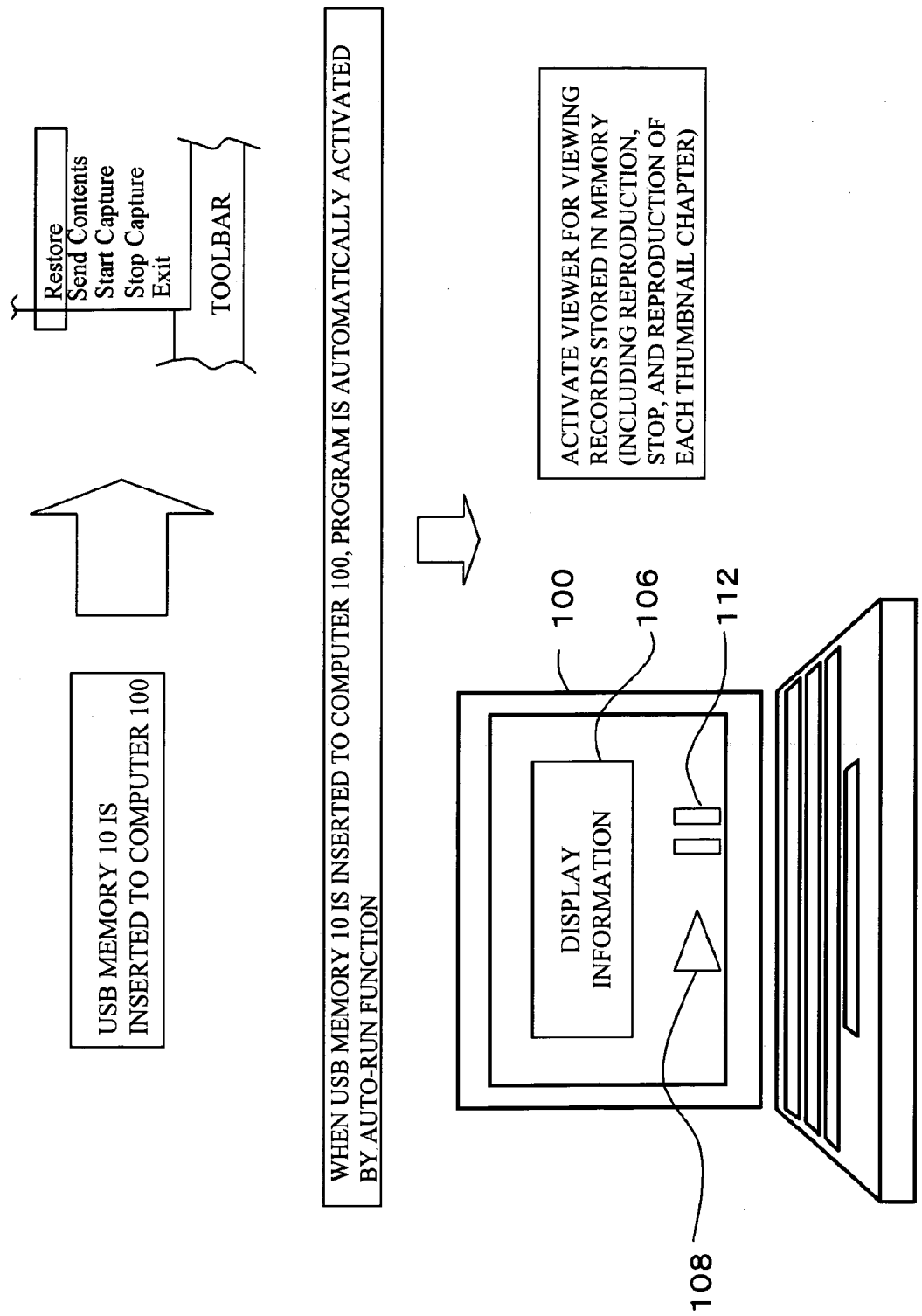
FIG. 6 schematically shows the functions of the viewer unit.

As shown in FIG. 6, the viewer unit 24 is automatically activated by an auto-run function, or is activated by an activation instruction issued by a user using the operating unit 105 shown in FIG. 3. The viewer unit 24 reads the conference information from the data region 18, and displays the conference information on the monitor 106 of the computer 100. In the example case shown in FIG. 6, the thumbnail of the image information and the associated audio information are displayed on the monitor 106. A start icon 108 and a stop icon 112 on the monitor 106 are clicked to reproduce the image and audio information and stop the reproduction. The reproduction of each thumbnail chapter can also be performed.

Figure 7:
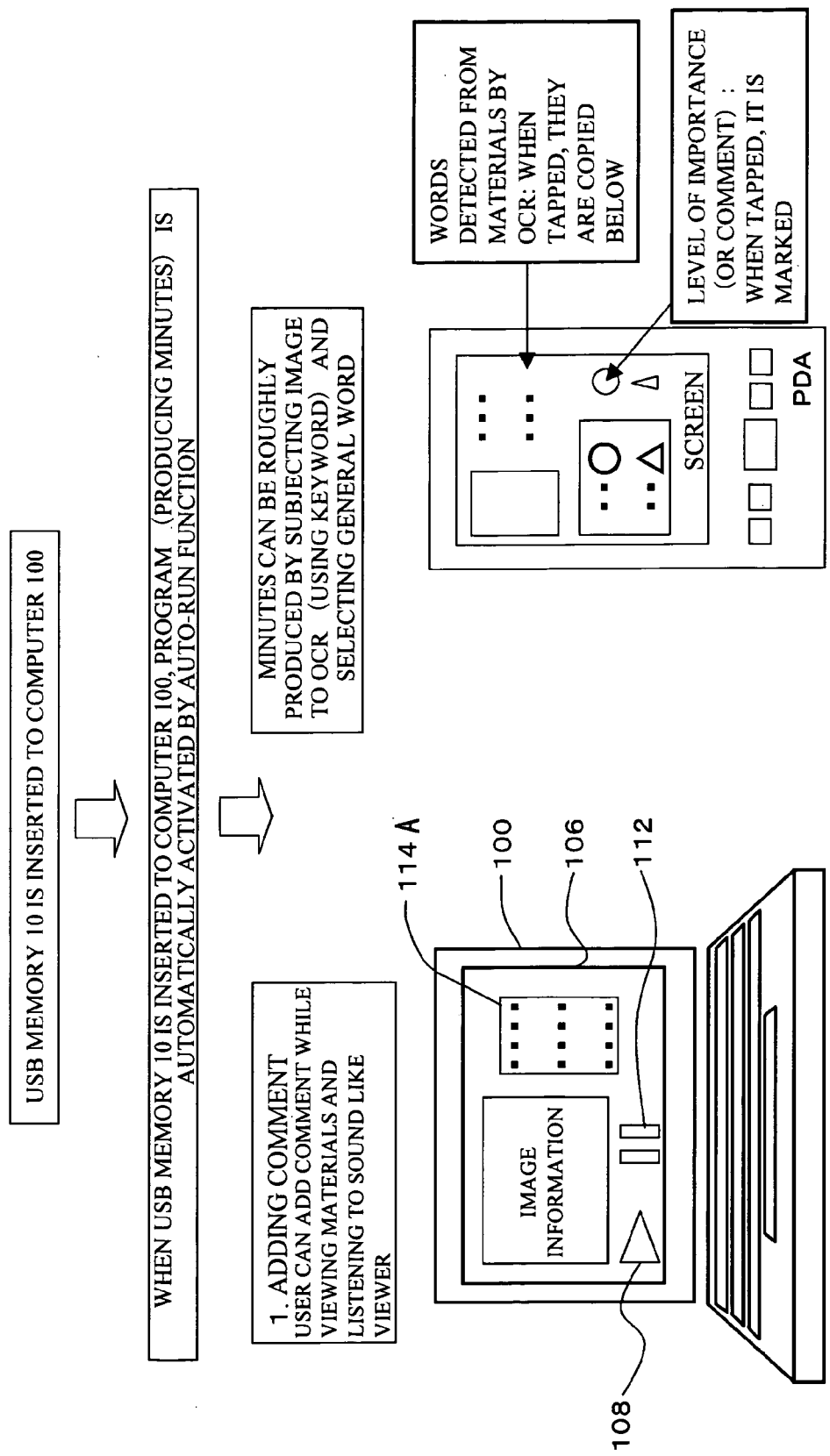
FIG. 7 schematically shows the functions of the minutes producing unit.

As shown in FIG. 7, the minutes producing unit 26 is automatically activated by an auto-run function, or is activated by an activation instruction issued by a user using the operating unit 105 shown in FIG. 3. The minutes producing unit 26 displays the conference information on the monitor 106, and produces minutes in accordance with an operation performed by the user. The minutes written by the user are displayed in a region 114A on the monitor 106. Also, as shown in FIG. 7, the conference information captured as image information may be subjected to an OCR operation, and the results of the character recognition may be displayed on the monitor 106. Here, a character to serve as a keyword is set. Such a character is tapped so as to insert a comment. The level of importance may also be set and be tapped so as to insert a comment.

Figure 8:
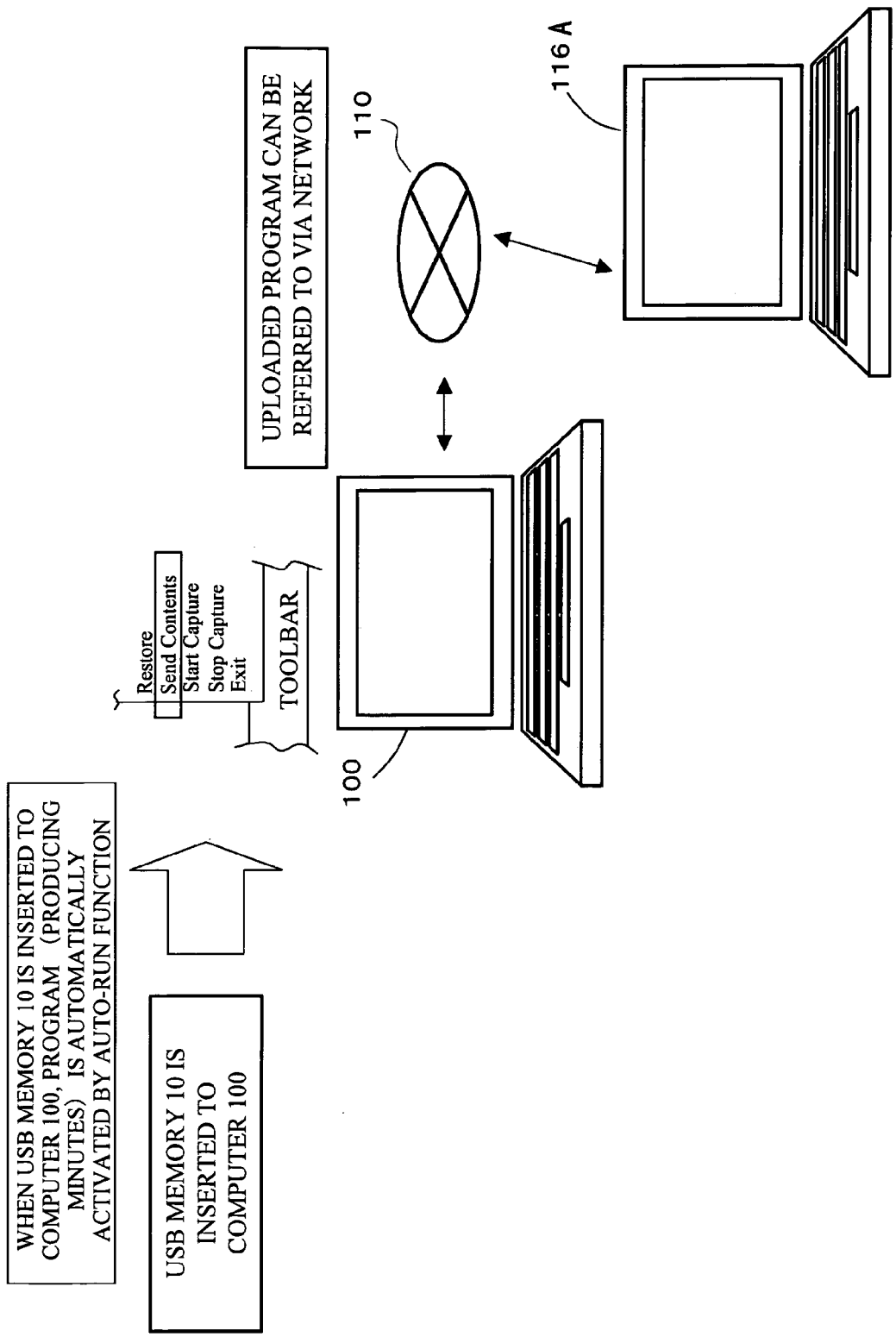
FIG. 8 schematically shows the functions of the uploading unit.

As shown in FIG. 8, the uploading unit 28 is automatically activated by an auto-run function, or is activated by an activation instruction issued by a user using the operating unit 105 shown in FIG. 3. The uploading unit 28 reads the conference information or the minutes information from the data region 18 of the USB memory 10, and uploads the conference information or the minutes information onto the server 30. The uploaded conference information or minutes information can be referred to by another computer 116A via the network 110 (shown in FIG. 3).

Next, the units shown in FIG. 2 are described in greater detail.

Figure 9:
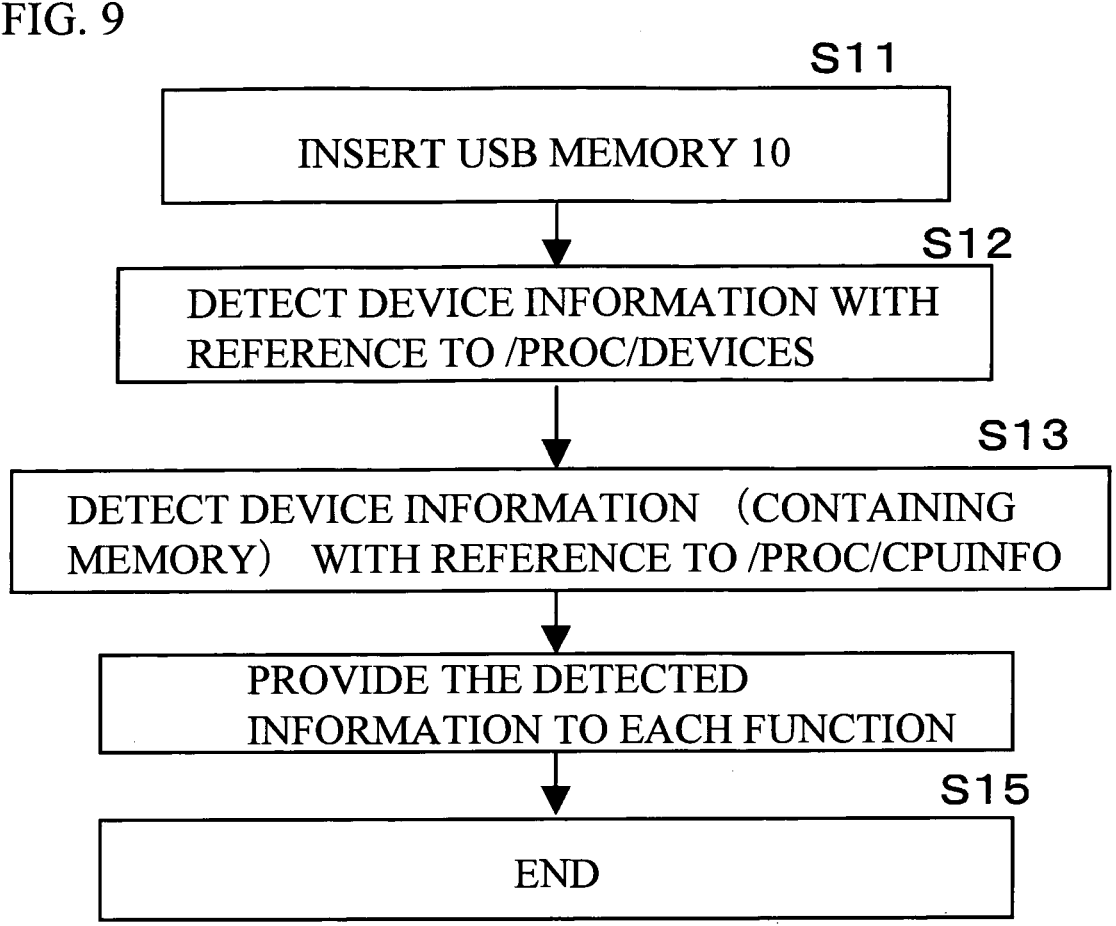
FIG. 9 is a flowchart of a part of an operation for detecting static information (the information unique to the device) in the program forming the PC performance and usage status detecting unit.

First, the PC performance and usage status detecting unit 20 is described. FIG. 9 is a flowchart of an operation of detecting static information (information unique to the device) in accordance with the program for realizing the PC performance and usage status detecting unit 20. When the CPU 101 detects the insertion of the USB memory 10 to the computer 100 (step S11), the CPU 101 refers to /proc/devices, so as to detect device information (step S12). The device information is the information as to an external device connected to the computer 100 or a device built in the computer 100. The CPU 101 then refers to /proc/cpuinfo, so as to detect the device information as to the CPU 101 (including the memory) (step S13). After storing the device information acquired in steps S12 and S13 into the data region 18, the CPU 101 transmits the device information to the respective units, which are the capturing unit 22, the viewer unit 24, the minutes producing unit 26, and the uploading unit 28 (step S14). In short, the CPU 101 stores the device information indicating the capability of the computer 100 into the data region 18, and controls the capturing unit 22, the viewer unit 24, the minutes producing unit 26, and the uploading unit 28 in accordance with the device information, so that a load can be applied in accordance with the capability and the operation status of the computer 100 (including the external device connected to the computer 100). The CPU 101 then ends the operation (step S15).

Figure 10:
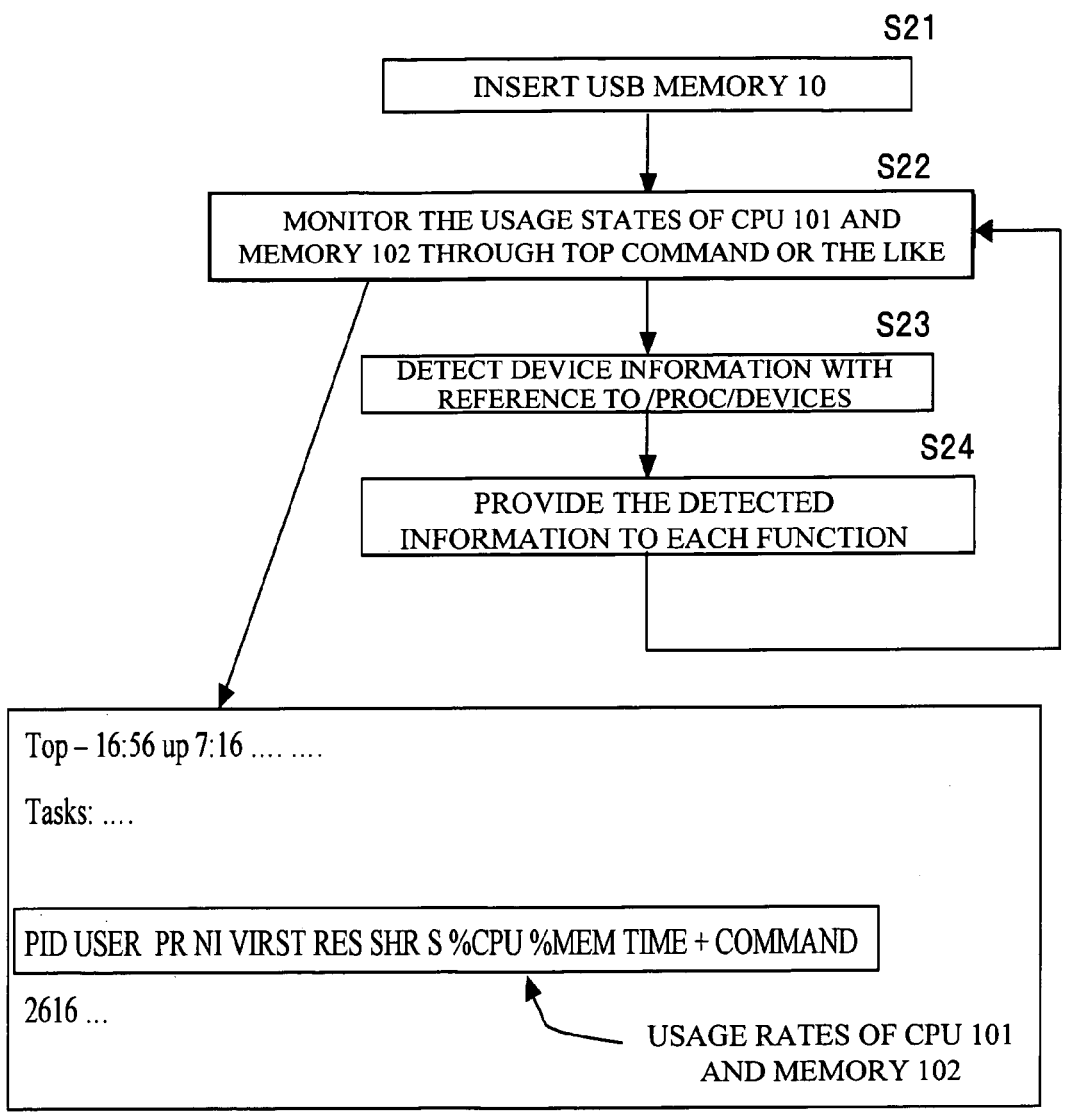
FIG. 10 is a flowchart of a part of the operation for detecting dynamic information (information that varies with operations and the likes) in the program forming the PC performance and usage status detecting unit.

FIG. 10 is a flowchart of an operation of detecting dynamic information (information varying with operations or the likes) in accordance with the program for realizing the PC performance and usage status detecting unit 20. When detecting the insertion of the USB memory 10 to the computer 100 (step S21), the CPU 101 monitors the usage states of the CPU 101 and the memory 102 in accordance with a "top" command or the like (step S22). In FIG. 10, an example of the data acquired in step S22 is shown (highlighted information). The CPU 101 then refers to /proc/devices, so as to detect device information (step S23). After storing the device information acquired in steps S22 and S23 into the data region 18, the CPU 101 transmits the device region to the respective functions, which are the capturing unit 22, the viewer unit 24, the minutes producing unit 26, and the uploading unit 28 (step S24). After step S24, the operation returns to step S22, and the CPU 101 repeats the above described procedures. The operation of receiving the device information acquired in steps S14 and S24 will be described later.

Figure 11:
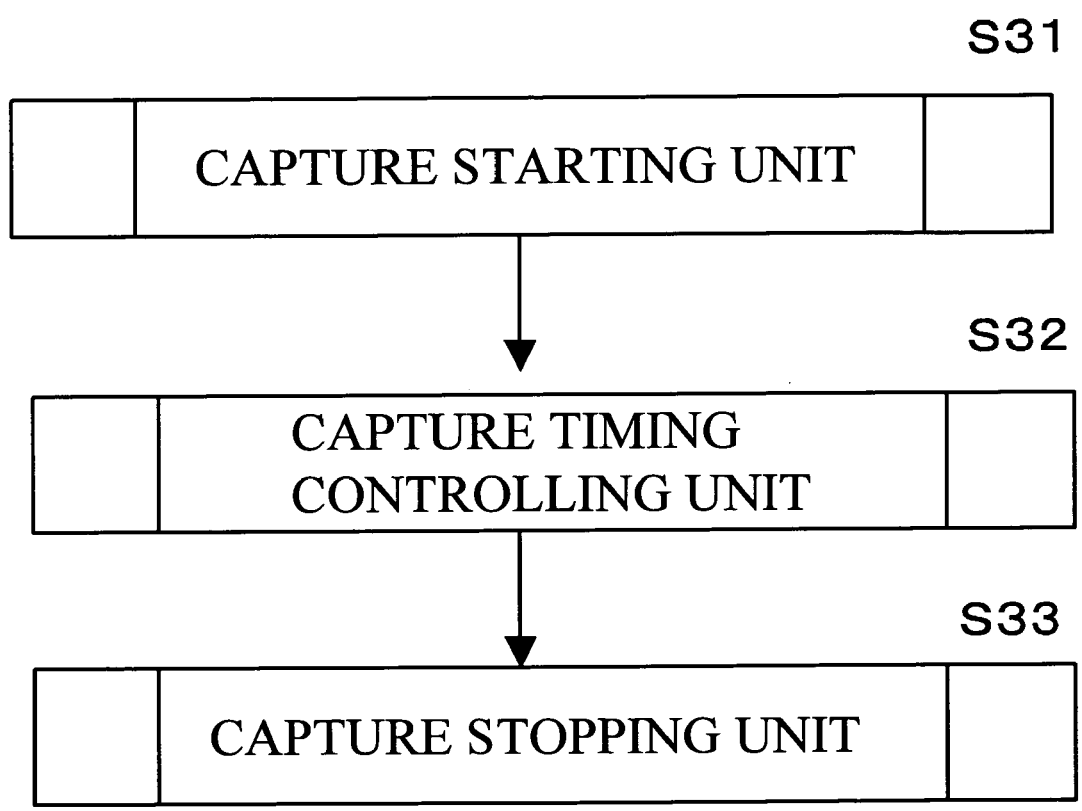
FIG. 11 is a block diagram showing the structure of the capturing unit.
Figure 12A:
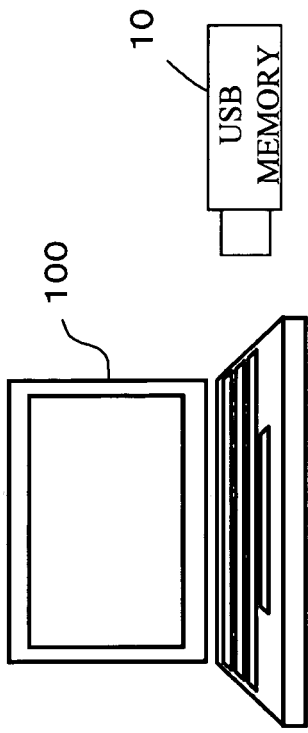
FIGS. 12A and 12B illustrate an example structure of the capture starting unit shown in FIG. 11.
Figure 12B:
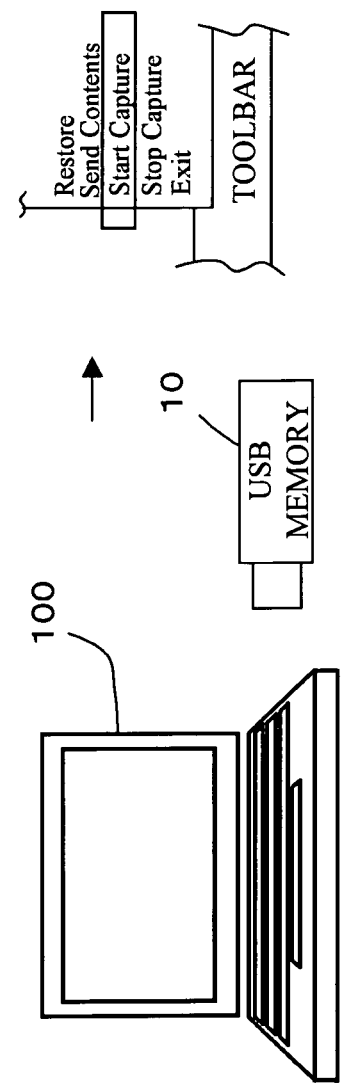

FIG. 11 is a block diagram illustrating the structure of the capturing unit 22. The capturing unit 22 includes a capture starting unit S31, a capture timing controlling unit S32, and a capture stopping unit S33. FIGS. 12A and 12B show example structures of the capture starting unit S31. In some cases, when the USB memory 10 is inserted to the computer 100, the capturing unit 22 (more specifically, the program for realizing the capturing unit 22) automatically initiates the start of the conference information acquiring operation, which is the start of the capturing operation, as shown in FIG. 12A. In other cases, when the USB memory 10 is inserted to the computer 100, the capturing operation is not started. Rather, the program is started through a taskbar or the like, as shown in FIG. 12B, and the timing of the capture is set by the user operating the operating unit 105 (shown in FIG. 3) through a mouse operation or a keyboard operation.

Here, in accordance with the static and dynamic information, which indicate the capability and the usage status of the computer 100 to which the USB memory 10 is inserted, the procedures in the capturing operation can be changed. For example, the optimum sampling rate at which image and audio information is subjected to sampling can be set in accordance with the power of the CPU 101 (such as the type and the operating clock of the CPU). Also, if there is a device attached to the computer 100, the conference information can be acquired from the device. For example, when the connection of a camera to the computer 100 is detected by the PC performance and usage status detecting unit 20, images through the camera can be captured as the conference information into the USB memory 10. Further, the sampling rate can be changed in accordance with the dynamic device information such as the usage rate of the CPU 101.

FIG. 13 shows specific examples of changes in sampling rate. The two tables shown in FIG. 13 are stored in the data region 18 of the USB memory 10. The static and dynamic device information obtained by the PC performance and usage status detecting unit 20 are compared with the two tables, so as to determine a recommendable image sampling rate and a recommendable audio sampling rate. The table 120 shown in FIG. 13 is a table used for comparison with the static device information, while the table 122 is a table used for comparison with the dynamic device information. The table 120 defines the recommendable audio sampling rate and the recommendable image sampling rate in association with the image resolution of the monitor 106, the device information as to the CPU 101, and the capacity of the RAM portion of the memory 102 (hereinafter the RAM portion will be sometimes referred to as the memory 102, for ease of explanation). The image resolution of the computer 100 and the device information as to the CPU 101 and the memory 102 are obtained as the device information from the PC performance and usage status detecting unit 20, so that the capturing unit 22 can determine the recommendable audio sampling rate and the recommendable image sampling rate. Also, the table 122 defines the recommendable audio sampling rate and the recommendable image sampling rate in association with the usage rate of the CPU 101 and the usage rate of the memory 102, as well as the image resolution and the static device information as to the CPU 101 and the memory 102. The dynamic device information such as the CPU usage rate and the memory usage status, as well as the image resolution of the computer 100 and the static device information as to the CPU 101 and the memory 102, is obtained from the PC performance and usage status detecting unit 20, so that the capturing unit 22 can determine the recommendable audio sampling rate and the recommendable image sampling rate.

Figure 14:
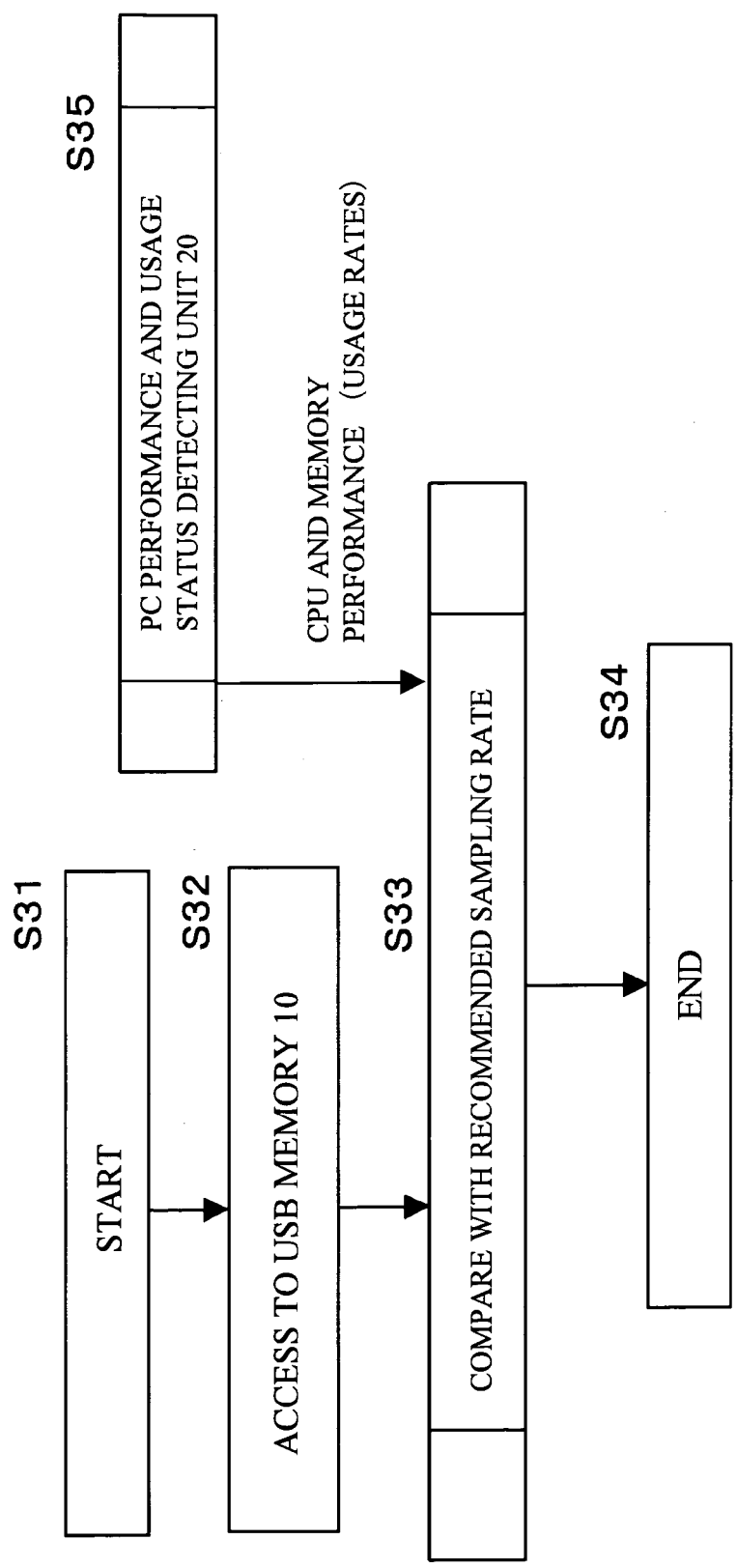
FIG. 14 is a flowchart of an operation to be performed by the capturing unit to determine and change the sampling rate.

FIG. 14 is a flowchart of the sampling rate determining and changing operation to be performed by the capturing unit 22. The capturing unit 22 has the program in which the procedures shown in FIG. 14 are written, and the CPU 101 (shown in FIG. 3) executes the program to determine or change the sampling rate. After starting an operation in predetermined timing (step S31), the CPU 101 accesses the USB memory 10 (step S32). The CPU 101 also receives the static and dynamic device information from the PC performance and usage status detecting unit 20, and transmits the device information to the capturing unit 22 (step S35). The CPU 101 executes the program of the capturing unit 22. The CPU 101 compares the information obtained in step S35 with the table 120 or 122, and then determines the recommendable audio sampling rate and the recommendable image sampling rate (step S33). In a case where only the static device information is provided, the CPU 101 refers to the table 120. In a case where both the static and dynamic device information is provided, the CPU refers to the table 122. The CPU 101 then ends the operation (step S34).

Figure 15:
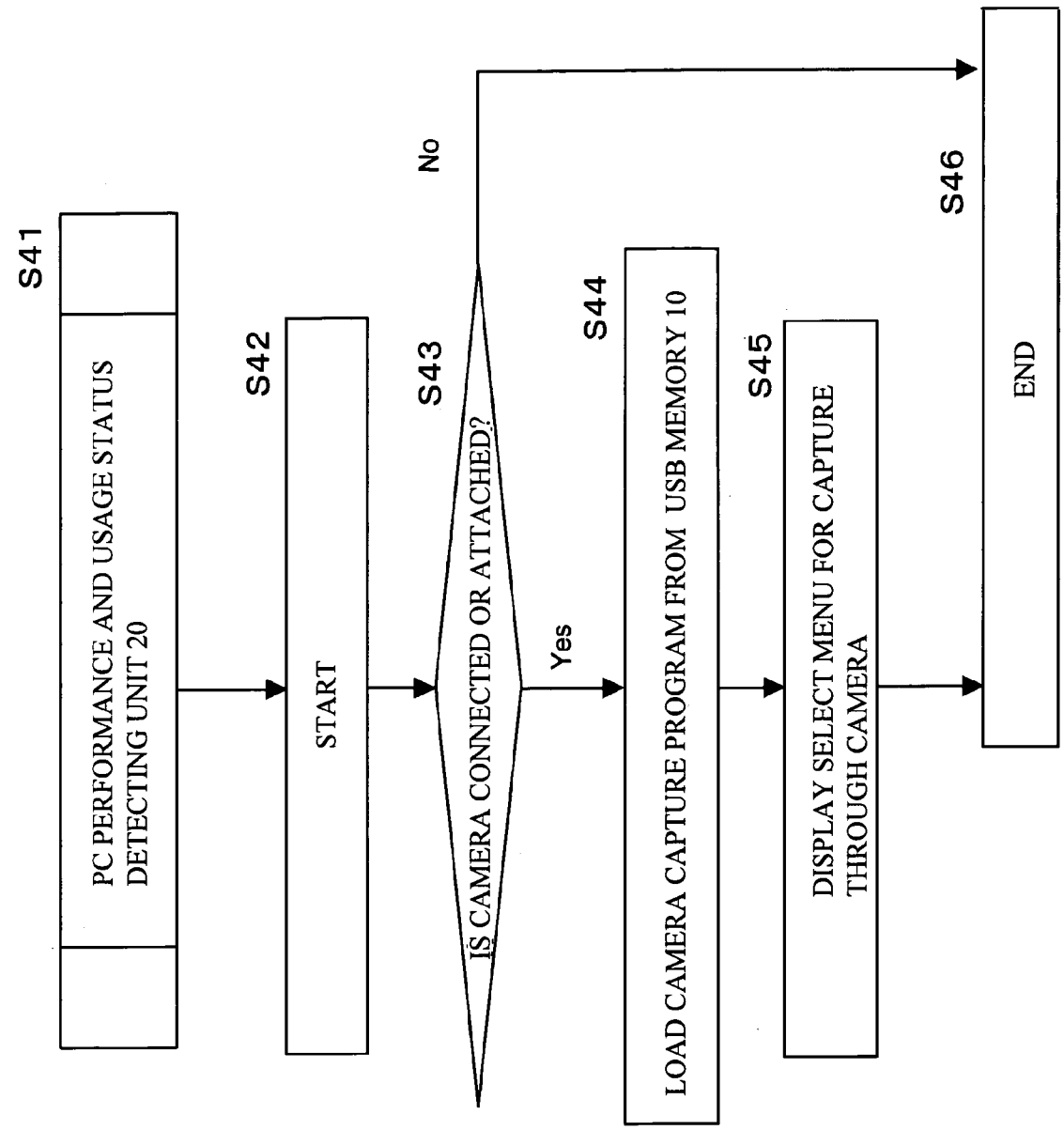
FIG. 15 is a flowchart showing another program of the capturing unit.

FIG. 15 is a flowchart showing another program of the capturing unit 22. In accordance with the type of device externally connected to the computer 100, the capturing unit 22 performs the operation shown in FIG. 15. The CPU 101 receives the device information obtained by the PC performance and usage status detecting unit 20 (step S41), and starts the program of the capturing unit 22 (step S42). The CPU 101 then determines whether a camera is connected to or provided in (built in) the computer 100 (step S43). If a camera is not connected to the computer 100, the CPU 101 ends the operation (step S46). If a camera is connected to the computer 100, the CPU 101 loads a camera capturing program from the USB memory 10 into the memory 102 (step S44). The CPU 101 then executes the loaded program, and displays a select menu for a camera capturing operation (step S45).

Figure 16A:
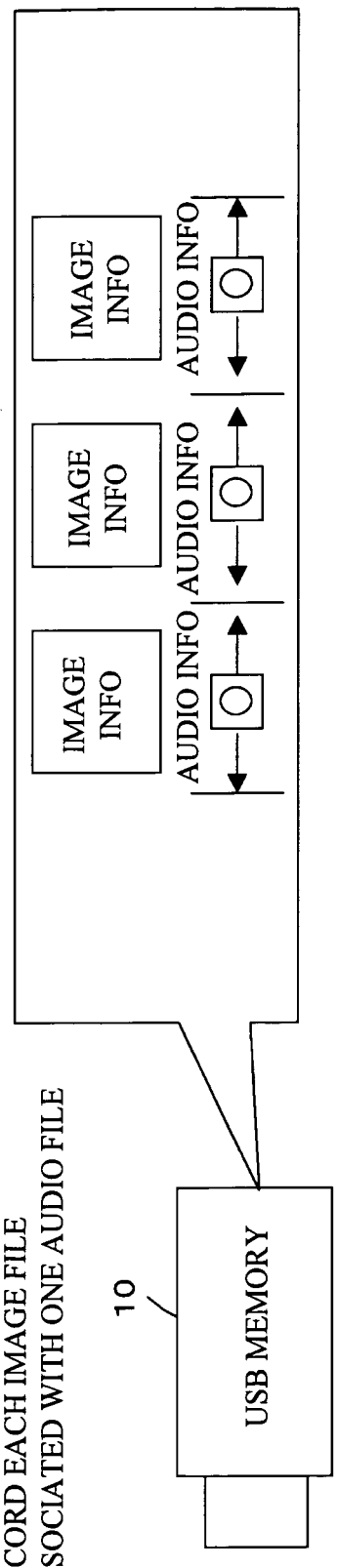
FIGS. 16A and 16B show formats of data to be captured.
Figure 16B:
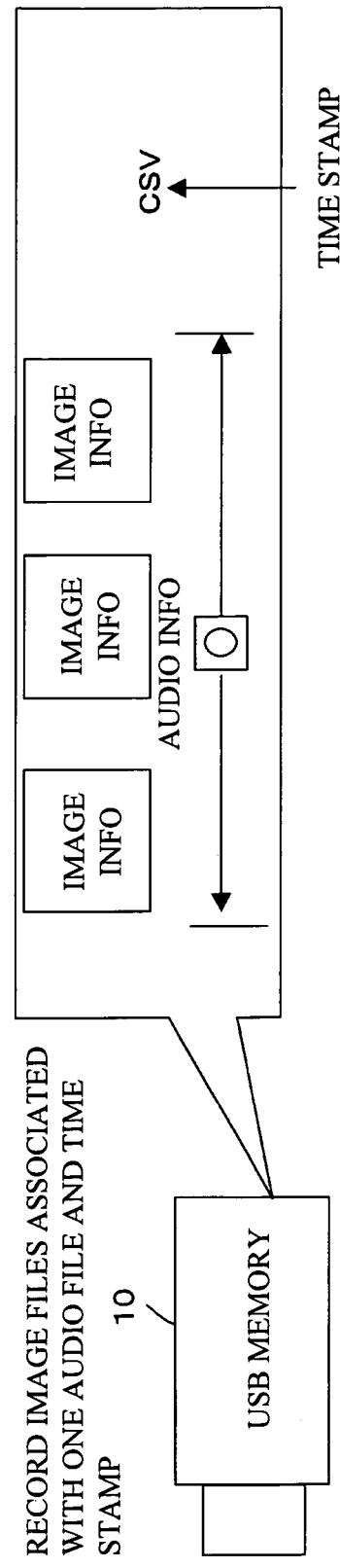

FIGS. 16A and 16B show the data formats for capturing operations. FIG. 16A shows a format for recording image files and audio files separately from one another. Here, the image files contain images of presentation applications or images taken by a camera, for example. Each audio file is linked to one image file (one image). FIG. 16B shows a format in which one audio file is linked to more than one image file, and a time stamp (CSV) is added to each file. In the case where a camera is connected to the computer, image files and audio files obtained from the camera may be linked to each another.

Figure 17:
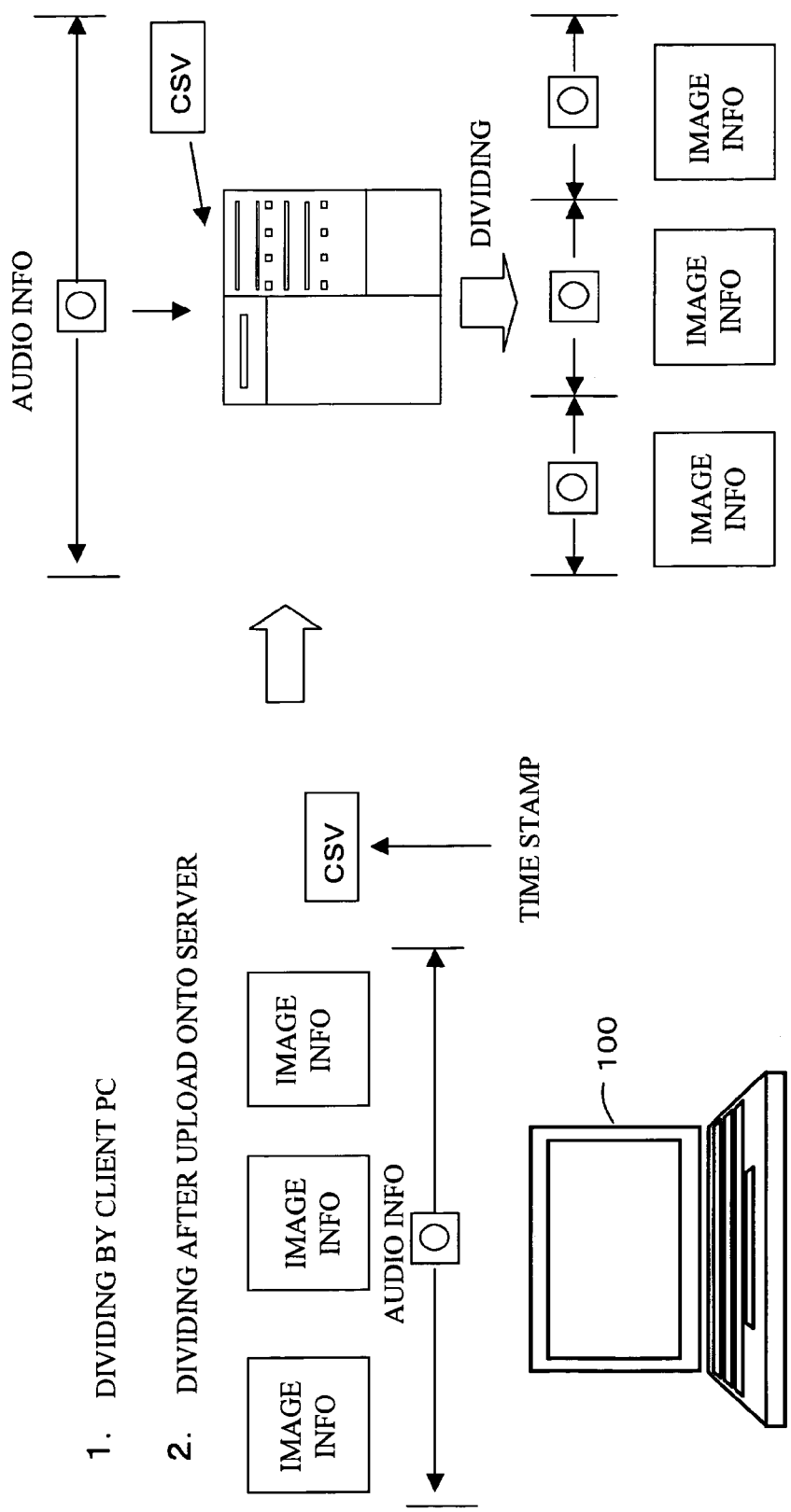
FIG. 17 show other data formats.

FIG. 17 shows yet another data format. The data format shown in FIG. 17 is used for recording a long audio file. When a long audio file is recorded, the CPU 101 divides the audio file into several files, using the time stamp file after the capturing operation, and connects each of the divided files to each corresponding image file. This operation may be performed in the computer 100 to which the USB memory 10 is inserted, or in the server 30 (shown in FIG. 2). The server 30 receives the single audio file and the images files, and divides the audio file.

Figure 18:
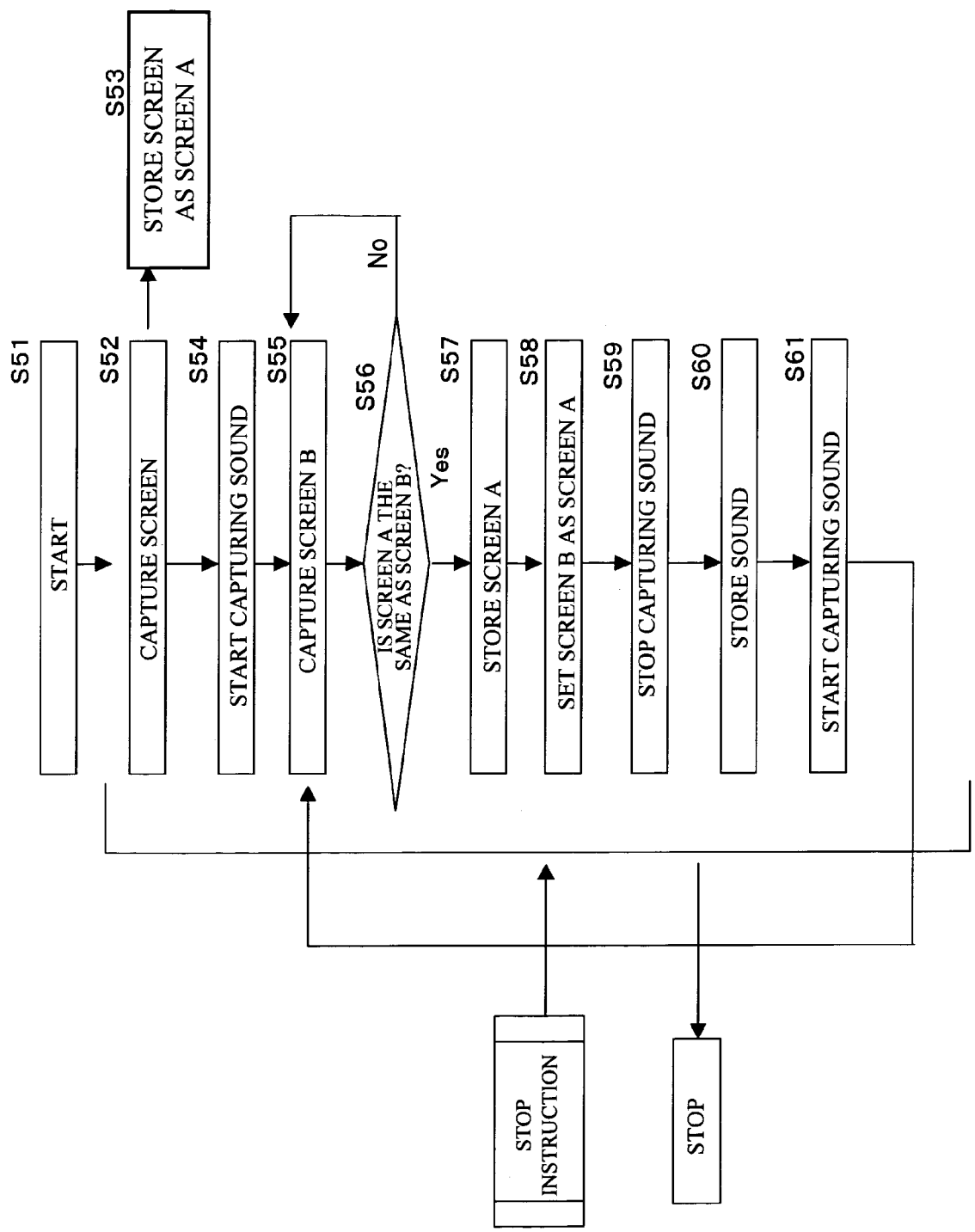
FIG. 18 shows the program structure of the capture timing controlling unit shown in FIG. 11.

FIG. 18 illustrates a program structure of the capture timing controlling unit S32 shown in FIG. 11. The capture timing controlling unit S32 detects screen switching caused by a user operation, so as to automatically synchronize image files (still images in this case) with audio files. The program in FIG. 18 is in accordance with the data format shown in FIG. 16A. After starting the program shown in FIG. 18 (step S51), the CPU 101 captures the screen on the monitor 106 (shown in FIG. 3) (step S52). This captured screen is set as screen A (step S53), and the CPU 101 starts capturing sound (step S54). The CPU 101 captures a screen (set as screen B) after a predetermined period of time (step S55), and determines whether the screen A is the same as the screen B (step S56). If not, the operation returns to step S55. If the screen A is the same as the screen B, the screen A is stored (step S57). The CPU 101 then sets the screen B as the screen A (step S58). The CPU 101 stops capturing sound (step S59), and stores the sound (step S60). The CPU 101 starts capturing the sound to be linked to the screen B (step S61), and returns to step S55. Upon receipt of a stop instruction issued from the capture stopping unit S33, the CPU 101 stops the operation. The stop instruction is issued from the capture stopping unit S33 when the USB memory 10 is pulled out of the computer 100 or a mouse or key operation is performed through the operating unit 105 (shown in FIG. 5).

Figure 19:
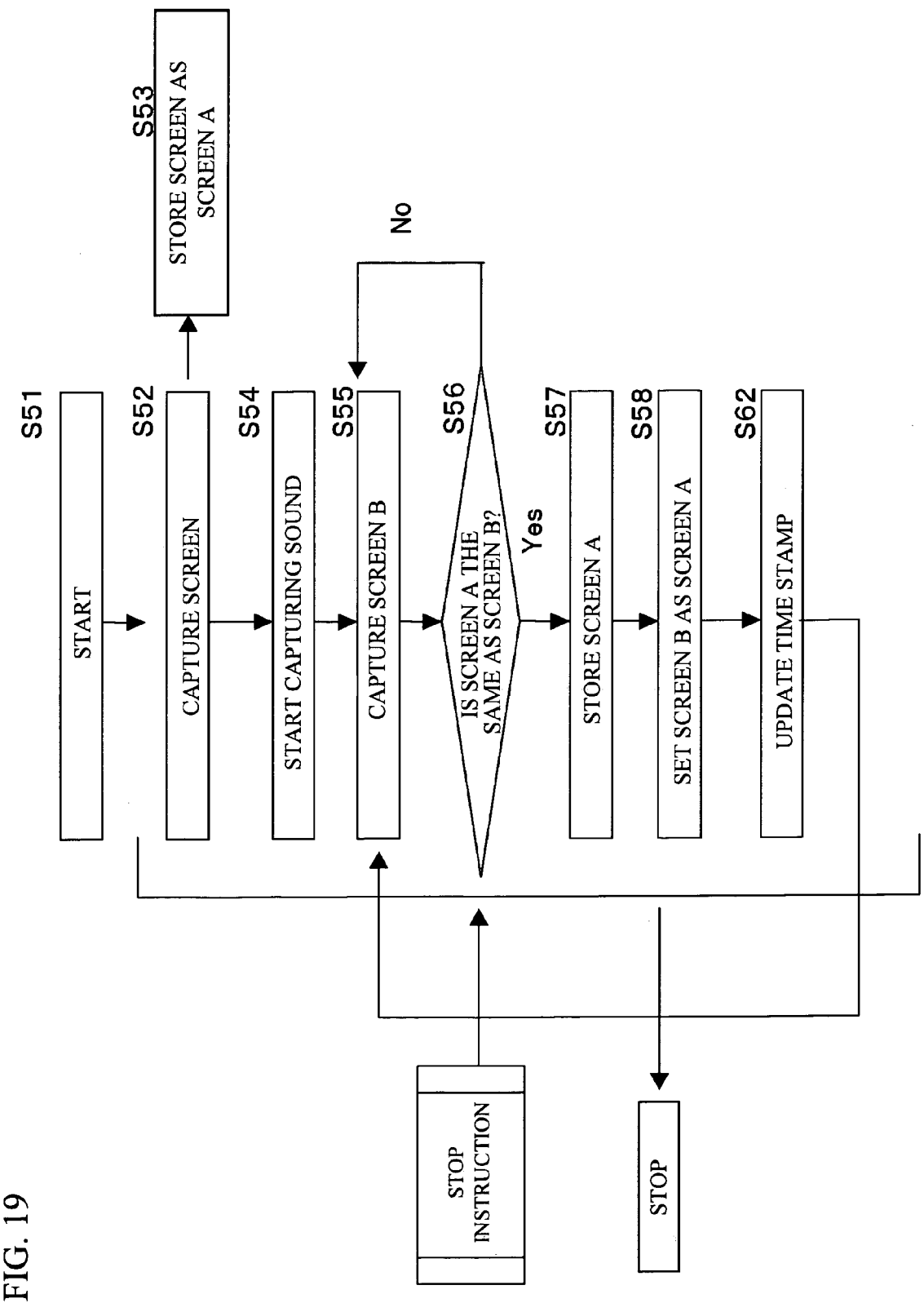
FIG. 19 shows another program structure of the capture timing controlling unit, and illustrates the structure in accordance with the data format shown in FIG. 16B.

FIG. 19 illustrates another program structure of the capture timing controlling unit S32. This program structure is in accordance with the data format shown in FIG. 16B. In FIG. 19, steps S51 through S58 are the same as steps S51 through S58 in FIG. 18. In the flowchart shown in FIG. 19, after step S18, the CPU 101 carries out step S62, to update the time stamp. Unlike the corresponding procedure shown in FIG. 19, the sound capturing operation is not stopped. Thus, one audio file can be produced for more than one image file.

Figure 20:
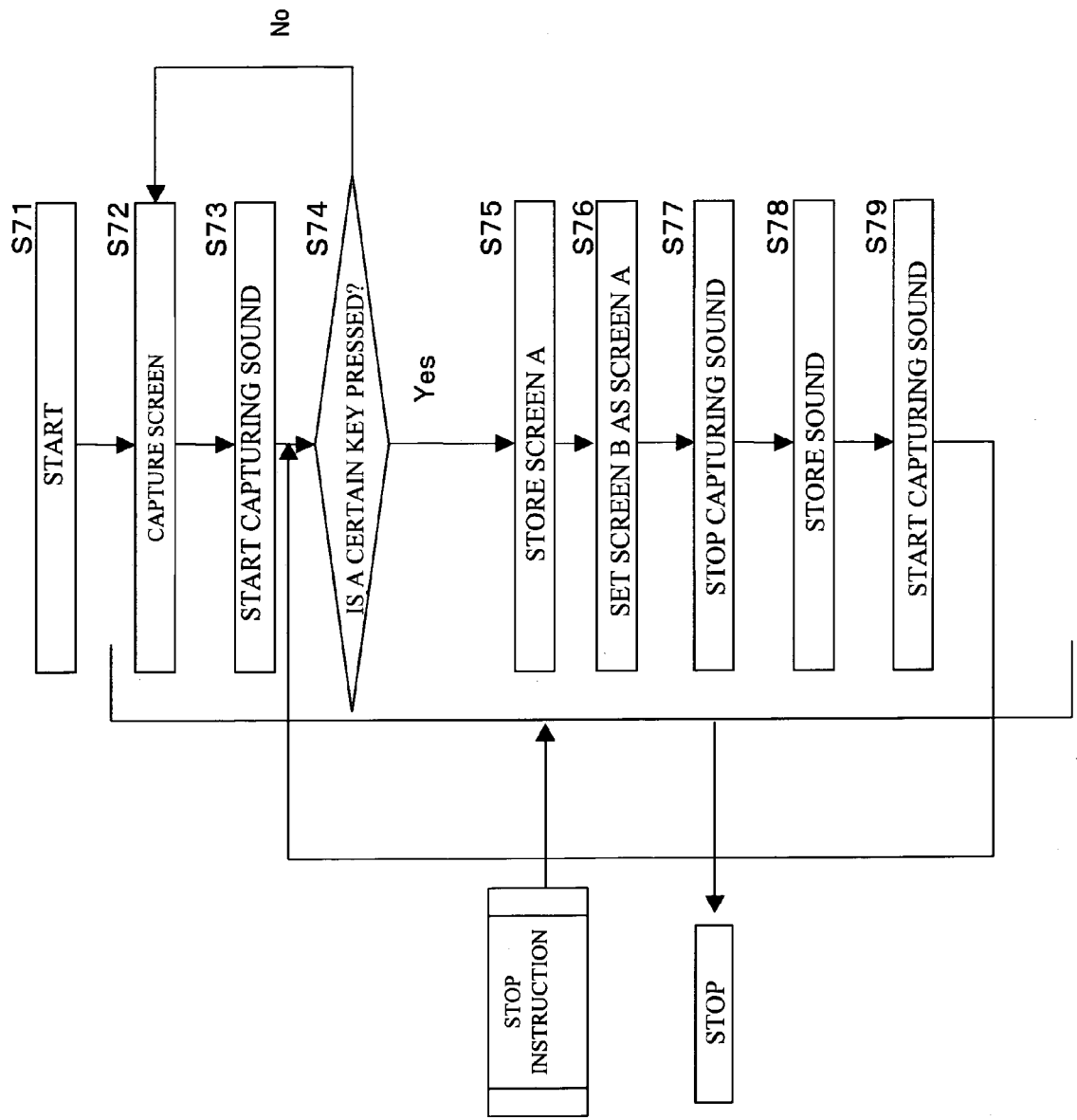
FIG. 20 shows yet another program structure of the capture timing controlling unit.

FIG. 20 shows yet another program structure of the capture timing controlling unit S32. This program is executed to perform a capturing operation when a user performs a certain key operation, and is in accordance with the data format shown in FIG. 16A. After starting the operation according to the program of the capture timing controlling unit S32 (step S71), the CPU 101 captures a screen (step S72), and starts capturing sound (step S73). The CPU 101 then determines whether a certain key is pressed (step S74). If not, the operation returns to step S72. If the certain key is pressed, the CPU 101 stores the screen (step S75), and sets the stored screen B as the screen A, as in the above described operation (step S76). The CPU 101 stops capturing the sound (step S77), and stores the sound (step S78). The CPU 101 then resumes capturing sound (step S79). Thus, one audio file can be linked to one image file.

Figure 21:
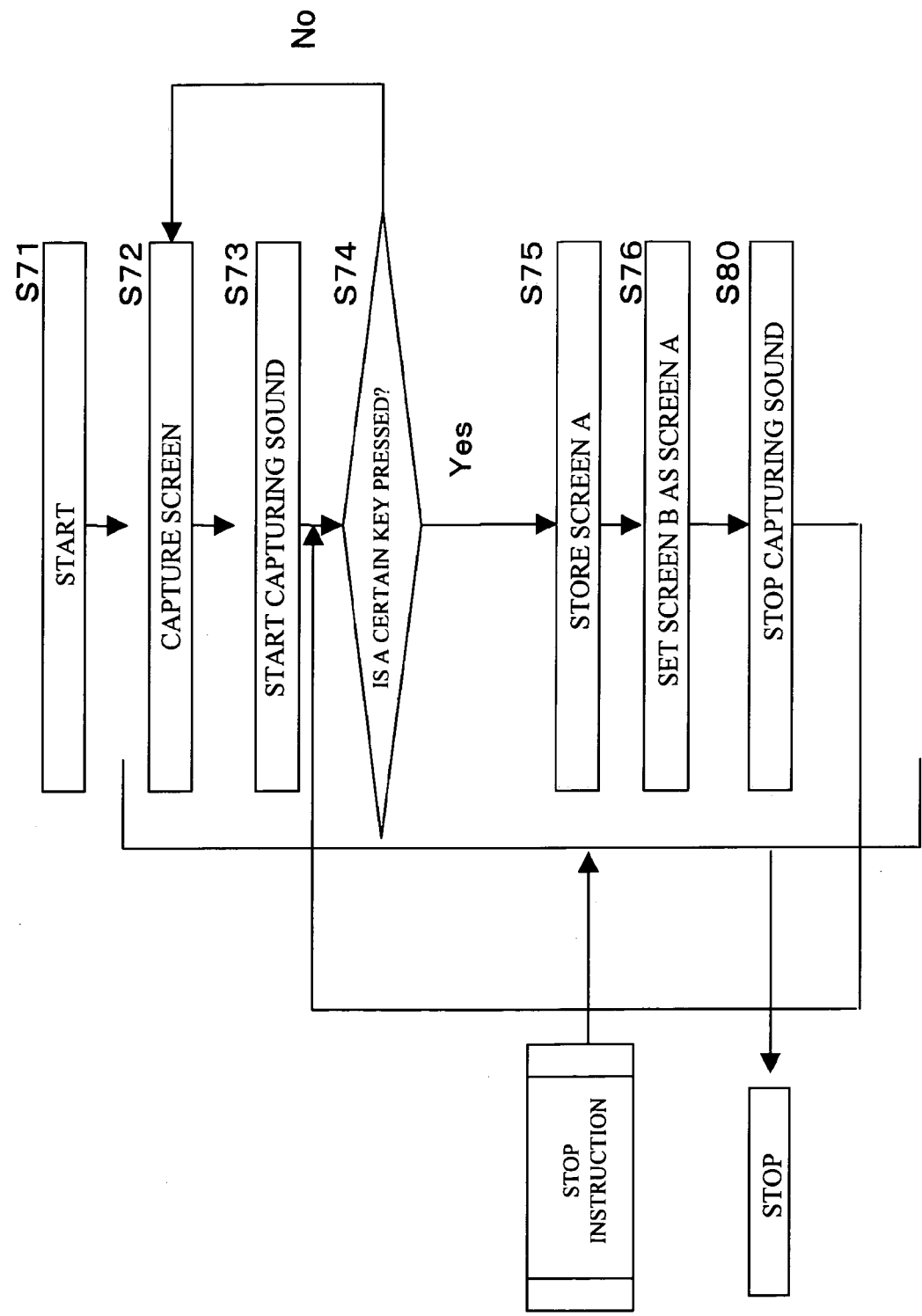
FIG. 21 shows still another program structure of the capture timing controlling unit.

FIG. 21 shows still another program structure of the capture timing controlling unit S32. This program is executed to perform a capturing operation when a user performs a certain key operation, and is in accordance with the data format shown in FIG. 16B. Steps S71 through S76 in FIG. 21 are the same as the corresponding steps in FIG. 20. After carrying out step S76, the CPU 101 updates the time stamp (step S80), and returns to step S74. Through this operation, one audio file can be linked to more than one image file.

Figure 22:
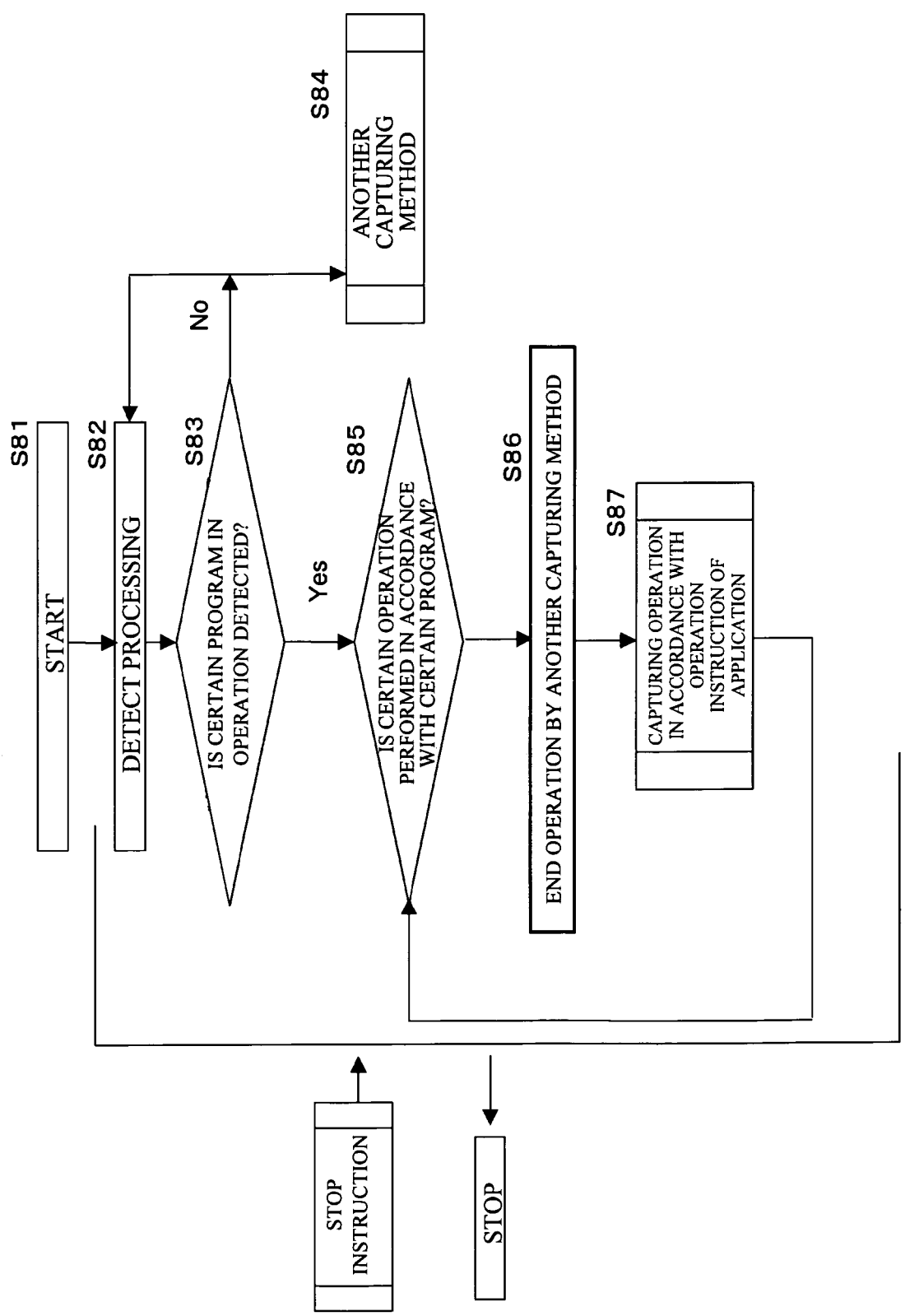
FIG. 22 shows yet another program structure of the capture timing controlling unit.

FIG. 22 shows yet another program structure of the capture timing controlling unit S32. This program structure detects an operation of a certain application ("ppt", for example), and performs a capturing operation in synchronization with the application operation (for example, switching slides). After starting the operation according to the program shown in FIG. 22 (step S81), the CPU 101 performs a process detecting operation (step S82). The CPU 101 determines whether a certain program is activated (step S83). The certain program may be a program for presentation, for example. If the result of the determination in step S83 indicates "No", the CPU 101 performs a capturing operation by another capturing method (step S84) or returns to step S82. If the result of the determination in step S83 indicates "Yes", the CPU 101 determines whether a certain operation is performed in accordance with a certain program (step S85). The certain operation may be an operation of switching slides, for example. If the result of the determination in step S85 indicates "No", the CPU 101 returns to step S85. If the result of the determination in step S85 indicates "Yes", the CPU 101 ends the capturing operation by the other capturing method (step S86). The other capturing method may be the capturing method illustrated in one of FIGS. 18 through 21, for example. The CPU 101 performs a capturing operation in accordance with a detected application operating instruction (step S87), and then returns to step S85.

Next, the viewer unit 24 shown in FIG. 2 is described. FIGS. 23A and 23B schematically illustrate the functions of the viewer unit 24. The CPU 101 executes the program of the viewer unit 24, so as to provide the function of reading a still image and sound from the data region 18 of the USB memory 10 and displaying the still image on the monitor 106 (FIG. 23A), and the function of reading a still image and sound and producing and displaying contents (for example, a Flash produced by Macromedia, Inc.) based on the still image and the sound (FIG. 23B).

The viewer unit 24 can change its functions (or image displays), based on the static and dynamic device information supplied from the PC performance and usage status detecting unit 20. For example, the viewer unit 24 forms a display screen in accordance with the screen resolution of the monitor 106, or forms such a display screen as to maintain visibility in accordance with the display area on the monitor 106 (for example, the entire image is enlarged and partially displayed, or the image is partially enlarged and displayed).

FIG. 24 shows three display magnification tables 130, 132, and 134 that are stored in the data region 18 of the USB memory 10. Using these display magnification tables, the viewer unit 24 changes its functions (forms or changes display screens) at the time of viewing. The display magnification table 130 defines display magnifications that are determined by the screen resolution of the monitor 106 of the computer 100 to which the USB memory 10 is inserted, the minimum point of characters that can be contained in each document, and the font types of those characters. The information as to the minimum point of characters contained in each document and the information as to the font types of those characters are obtained through the application for presentation or by subjecting image information to an OCR operation. The display magnification table 132 defines display magnifications that are determined by the screen resolution of the monitor 106 of the computer 100 to which the USB memory 10 is inserted, the median point among the characters contained in each document, and the most used font type among those characters of the median point. The information as to the medium point among the characters contained in each document, and the information as to the most used font type among those characters of the medium point are obtained through the application for presentation or by subjecting image information to an OCR operation. The display magnification table 134 defines display magnifications that are determined by the screen resolution of the monitor 106 of the computer 100 to which the USB memory 10 is inserted, the average point among the characters contained in each document, and the most used font type among those characters of the average point. The information as to the average point among the characters contained in each document and the information as to the most used font type among those characters of the average point are obtained through the application for presentation or by subjecting image information to an OCR operation.

Figure 25:
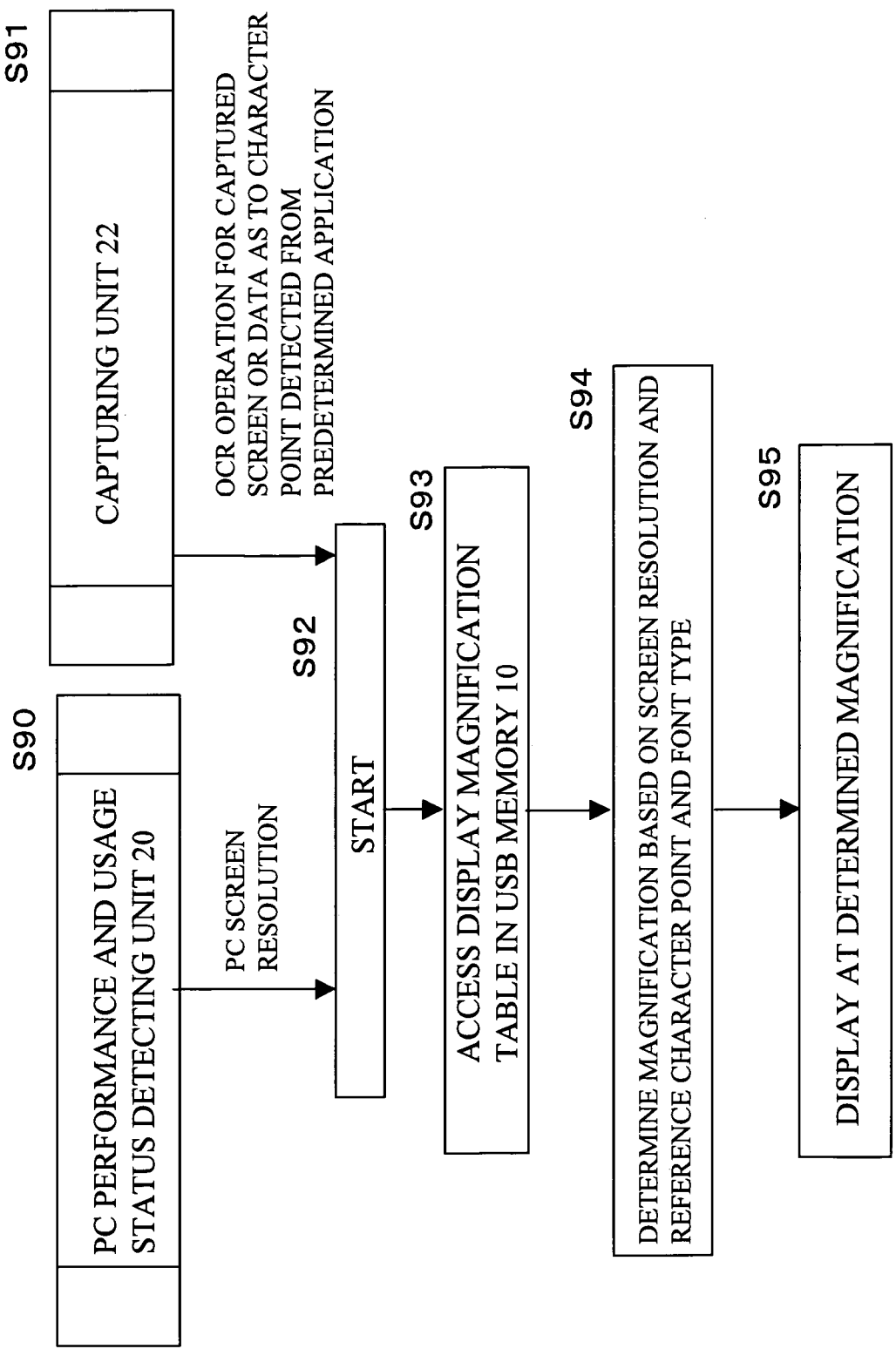
FIG. 25 is a flowchart showing the structure of a program forming the view unit.

FIG. 25 is a flowchart showing the program structure of the viewer unit 24. The CPU 101 reads in the program of the viewer unit 24, and acquires the device information (including the screen resolution of the monitor 106) from the PC performance and usage status detecting unit 20 and the information as to the point and the font types from the capturing unit 22 (steps S90 and S91). The CPU 101 then starts an operation (step S92). The CPU 101 accesses the display magnification tables 130, 132, and 134 (shown in FIG. 24) stored in the data region 18 of the USB memory 10 (step S93), and determines a display magnification based on the screen resolution and the point and the font type of a reference character (step S94). If two or more sets of information as to the point and the font type of the reference character (at least two of the three display magnification tables 130, 132, and 134) are obtained, the levels of importance are set to the sets of information. A display magnification can be determined by referring to the point and the font type of the character having the highest level of importance.

Figure 26:
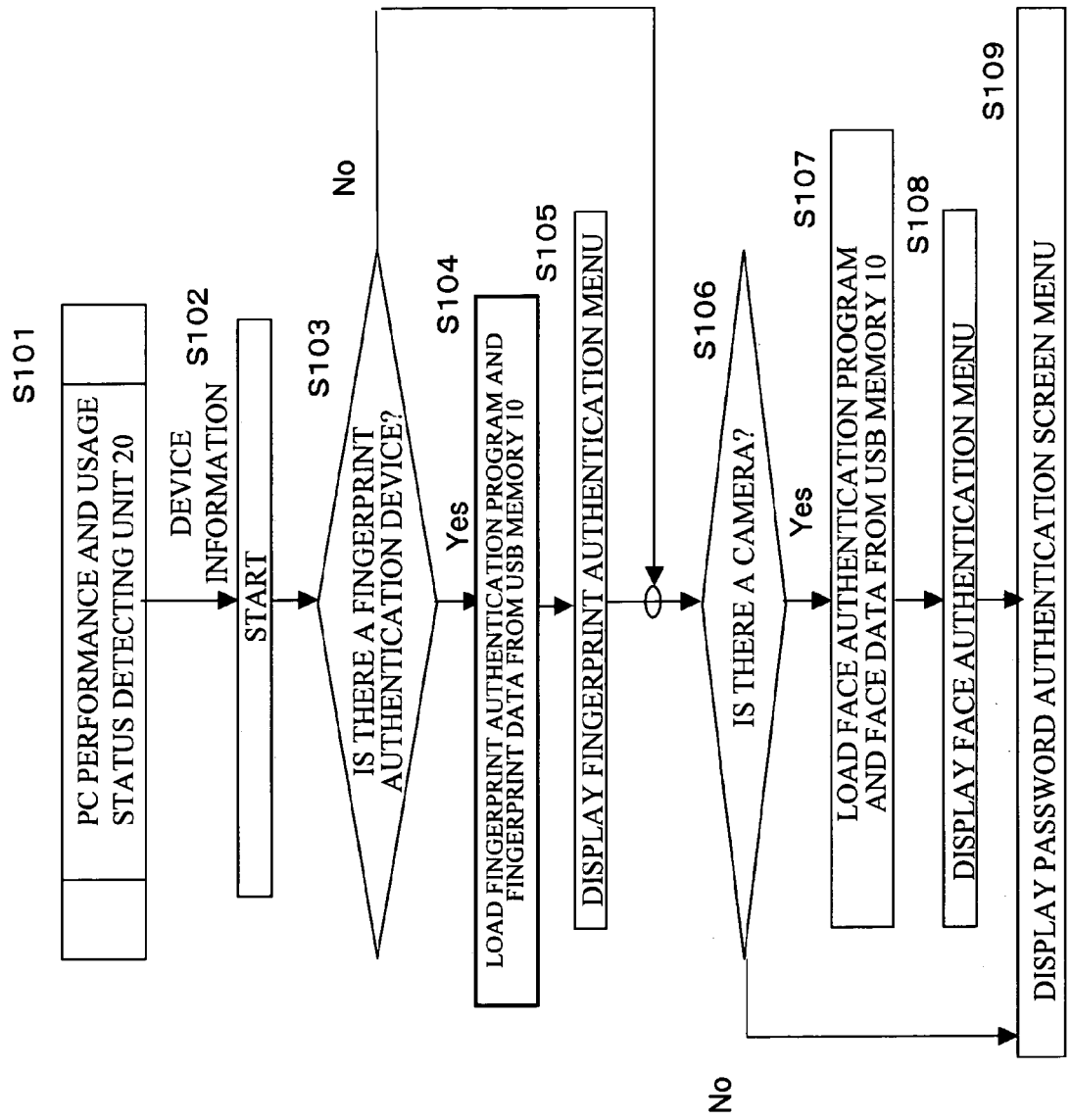
FIG. 26 is a flowchart showing the structure of another program forming the viewer unit.

FIG. 26 is a flowchart showing another program structure of the viewer unit 24. Like the program structure shown in FIG. 25, this program structure changes the display functions in accordance with the capability or the like of the computer 100 to which the USB memory 10 is inserted. However, the program structure shown in FIG. 26 further performs an authenticating operation. The CPU 101 reads in the program of the viewer unit 24, and receives the device information from the PC performance and usage status detecting unit 20 (step S101). The CPU 101 then starts an operation (step S102). Based on the device information, the CPU 101 determines whether a fingerprint authentication device exists (step S103). If the result of the determination in step S103 indicates "No", the CPU moves on to step S106. If the result of the determination in step S103 indicates "Yes", the CPU 101 moves on to step S104. The CPU 101 loads a fingerprint authentication program and fingerprint data from the USB memory 10. The fingerprint authentication program and the fingerprint data are part of the functions of the viewer unit 24, and are stored in the program region 16 and the data region 18 of the USB memory 10. The CPU 101 displays a fingerprint authentication menu produced in accordance with the fingerprint authentication program on the monitor 106. The CPU 101 then determines whether a camera is connected to the computer 100 (step S106). If not, the CPU 101 moves on to step S109, in which the CPU 101 causes the monitor 106 to display a password authentication menu. If the result of the determination in step S106 indicates "Yes", the CPU 101 loads a face authentication program and face data from the USB memory 10 into the memory 102 (step S107). The face authentication program and the face data are part of the functions of the viewer unit 24, and are stored in the program region 16 and the data region 18 of the USB memory 10. The CPU 101 causes the monitor 106 to display a face authentication menu (step S108).

The minutes producing unit 26 is as described above. Through the functions of the uploading unit 28 described below or as attachment to electronic mail, the minutes produced by the minutes producing unit 26 and the contents such as image information and audio information to be displayed by the viewer unit 24 can be transmitted to computers registered in advance or designated by users via the network 110 (shown in FIG. 3).

Next, the uploading unit 28 for uploading conference information such as audio data, conference data, and minutes data, is described.

Figure 27:
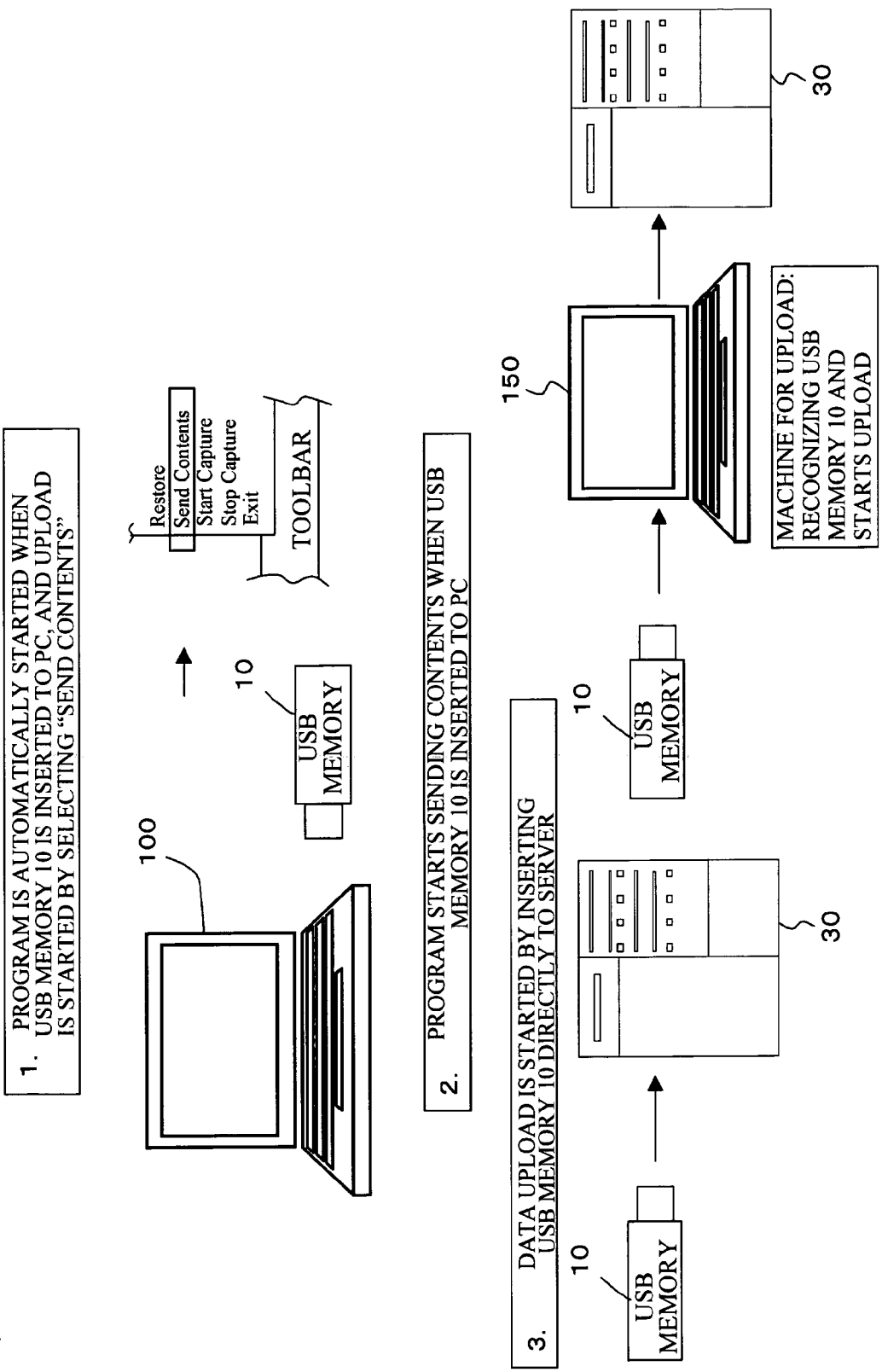
FIG. 27 schematically illustrates the functions of the uploading unit.
Figure 28:
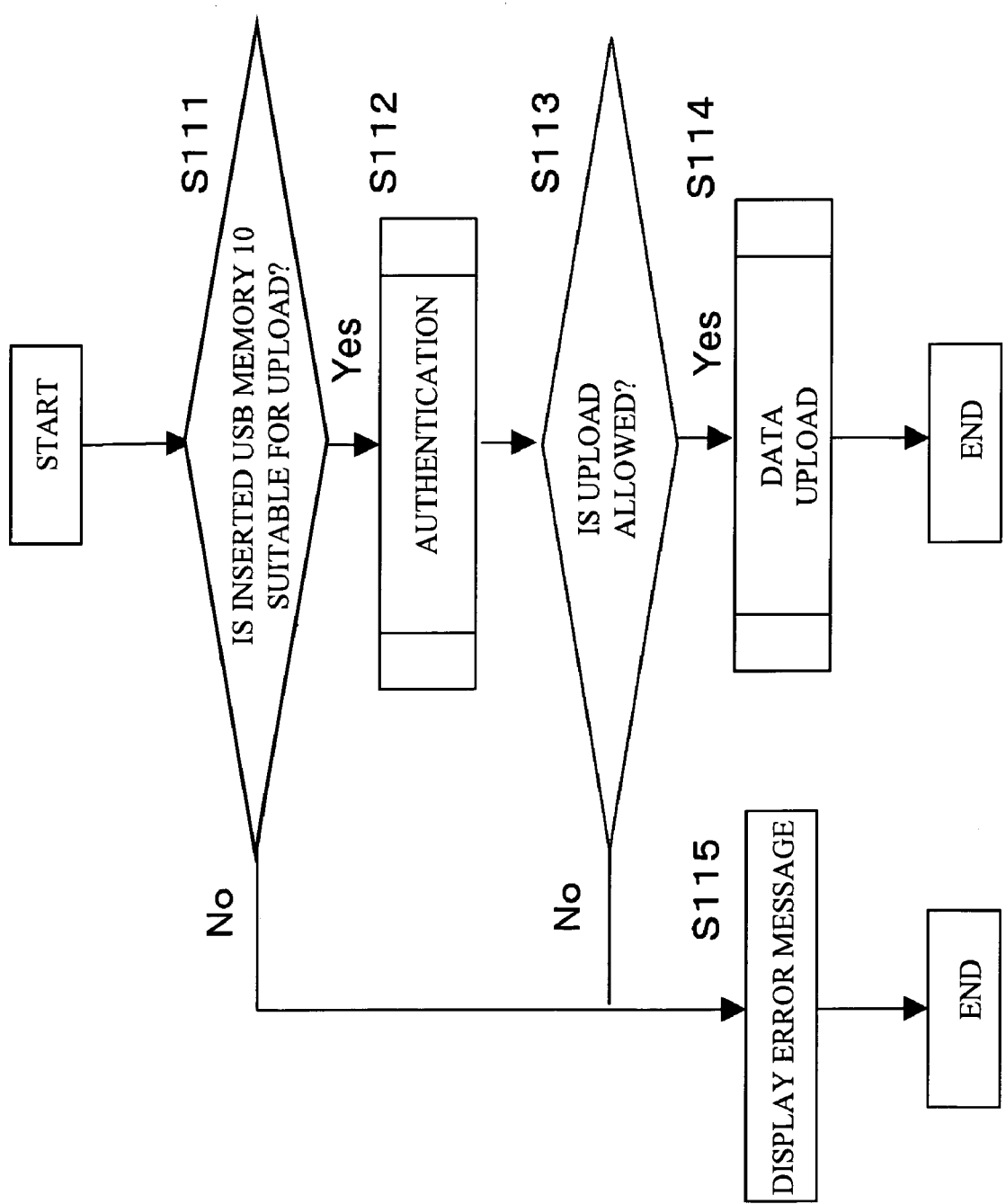
FIG. 28 shows an example of a contents uploading operation.

FIG. 27 schematically illustrates the functions of the uploading unit 28. The CPU 101 reads in the program of the uploading unit 28, and performs the following operation. When the USB memory 10 is inserted to the computer 100, the uploading unit 28 is automatically activated. As contents transmission is selected, the uploading unit 28 starts an uploading operation. Other than this operation, the uploading unit 28 may automatically start transmitting contents when the USB memory 10 is inserted to the computer 100. Alternatively, the USB memory 10 may be inserted directly to the server 30, so that the contents can be uploaded onto the server 30. Further, the USB memory 10 may be inserted to a computer 150 specially designed for upload, so that the contents can be uploaded onto the server 30 via the computer 150. The contents uploading operation using the computer 150 designed for upload is a known operation, and generally has an operation flow shown in FIG. 28. The program of the uploading unit 28 in which the procedures shown in FIG. 28 are written determines whether the USB memory 10 is designed for upload (step S111). This procedure is carried out by determining whether a confidential data region is formed in the data region 18 of the USB memory 10, for example. In the confidential data region, data (as to authentication, for example), server information (IP and the likes), the ID unique to the memory, upload authentication information (such as a password), and the likes are stored in advance. If the result of the determination in step S111 indicates "No", the CPU 101 displays an error message on the monitor 106 (step S115), and ends the operation. If the result of the determination in step S111 indicates "Yes", the CPU 101 performs an authenticating operation (step S112). In the authenticating operation, the information held in the server 30 is compared with the information stored in the confidential data region. If the CPU 101 determines that upload is allowed based on the result of the authentication, the data is uploaded (step S114). If the CPU 101 determines that upload is not allowed, step S115 is carried out. The server 30 may be preset as an upload destination, or a server list is stored in the data region 18 of the USB memory 10 so that a user can select a desired server through the operating unit 105.

The network 110 to which the server 30 is connected may not be the Internet, but may be Bluetooth, an infrared communication network, a wireless LAN, or the like. It is also possible to store the information indicating networks to which the USB memory 10 can be connected in the data region 18, and perform an uploading operation onto the server 30 using one of the connectable networks.

Figure 29:
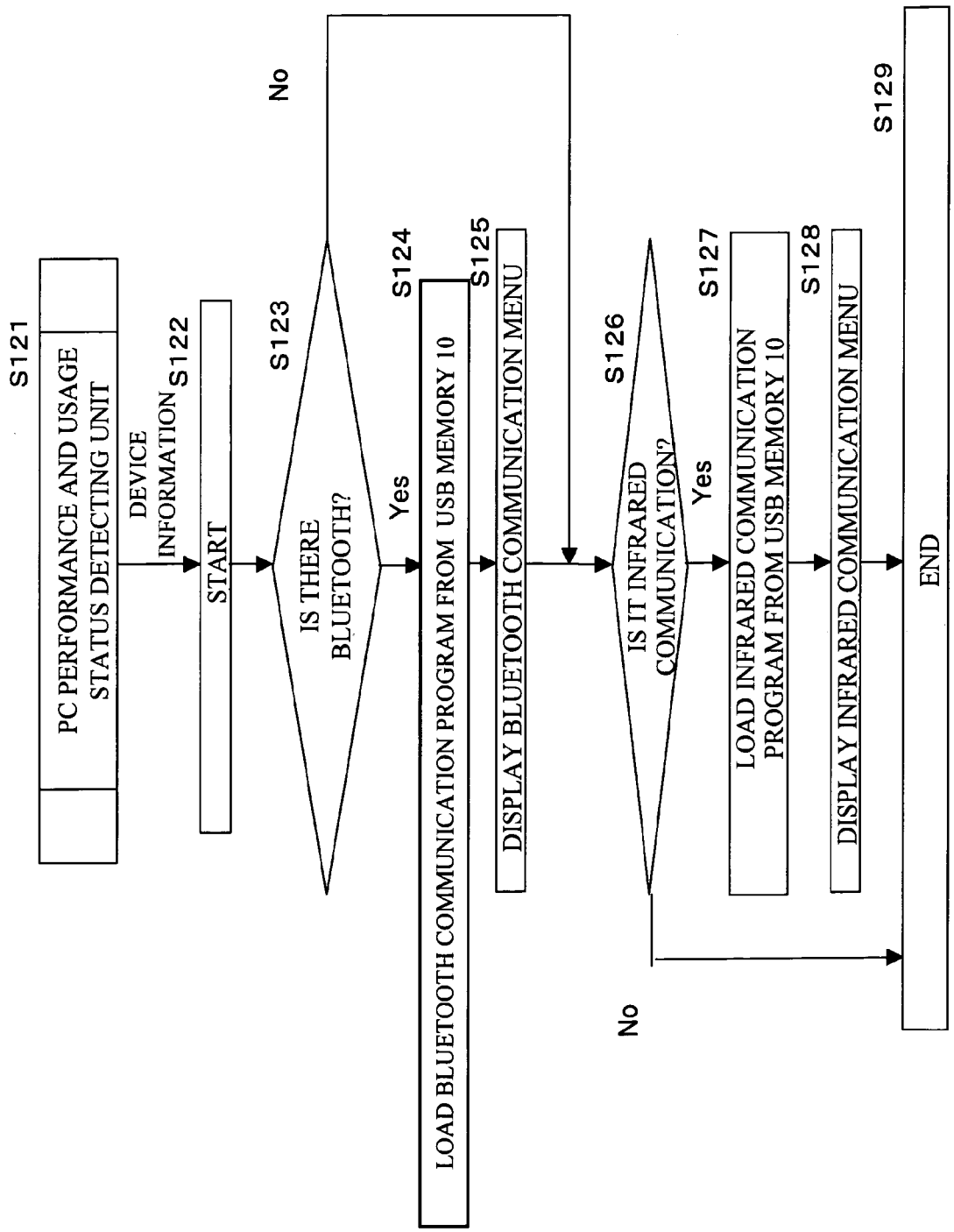
FIG. 29 shows another example of a contents uploading operation.

This operation is shown in FIG. 29. The uploading unit 28 has the program shown in FIG. 29. After loading this program into the memory 102, the CPU 101 receives the device information from the PC performance and usage status detecting unit 20 (step S121), and starts an operation (step S122). The CPU 101 determines whether Bluetooth is set in the USB memory 10 (step S123). If it is, the CPU moves onto step S124. If Bluetooth is not set in the USB memory 10, the CPU 101 moves on to step S126. In step S124, the CPU 101 loads a Bluetooth communication program from the program region 16 of the USB memory 10 into the memory 102. The CPU 101 then displays a Bluetooth communication menu on the monitor 106 (step S106). The CPU 101 determines whether infrared communication is set in the USB memory 10 (step S126). If not, the CPU 101 ends the operation (step S129). If infrared communication is set in the USB memory 10, the CPU 101 loads an infrared communication program from the program region 16 of the USB memory 10 into the memory 102 (step S127). The CPU 101 then displays an infrared communication menu on the monitor 106 (step S128), and ends the operation (step S129).

Figure 30:
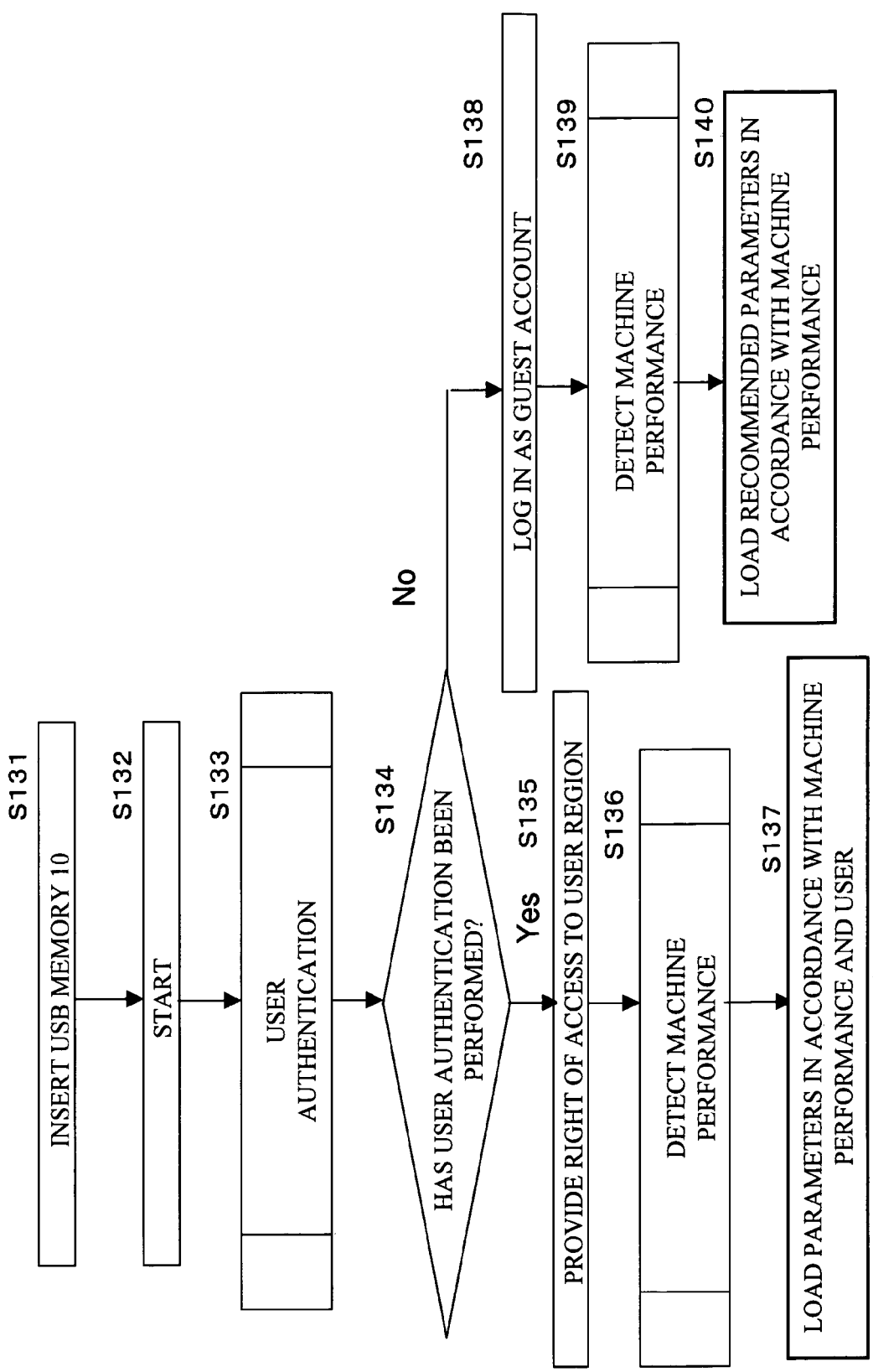
FIG. 30 is a flowchart of the program for realizing personal environment settings (for each user)

FIG. 30 is a flowchart of a program for setting environments for individuals (for each user). The USB memory 10 holds the information for defining the environments for individuals in the data region 18. The environments to be provided include a memory area for capturing operations, an access area for the viewer and for producing minutes, and various parameters at the time of providing information (such as the microphone setting and the viewer magnification at the time of a capturing operation). Since the functions together with the capability of the computer 100 are provided, environments similar to the settings for individuals can also be loaded into the computer 100 to which the USB memory 10 is inserted.

Figure 31:
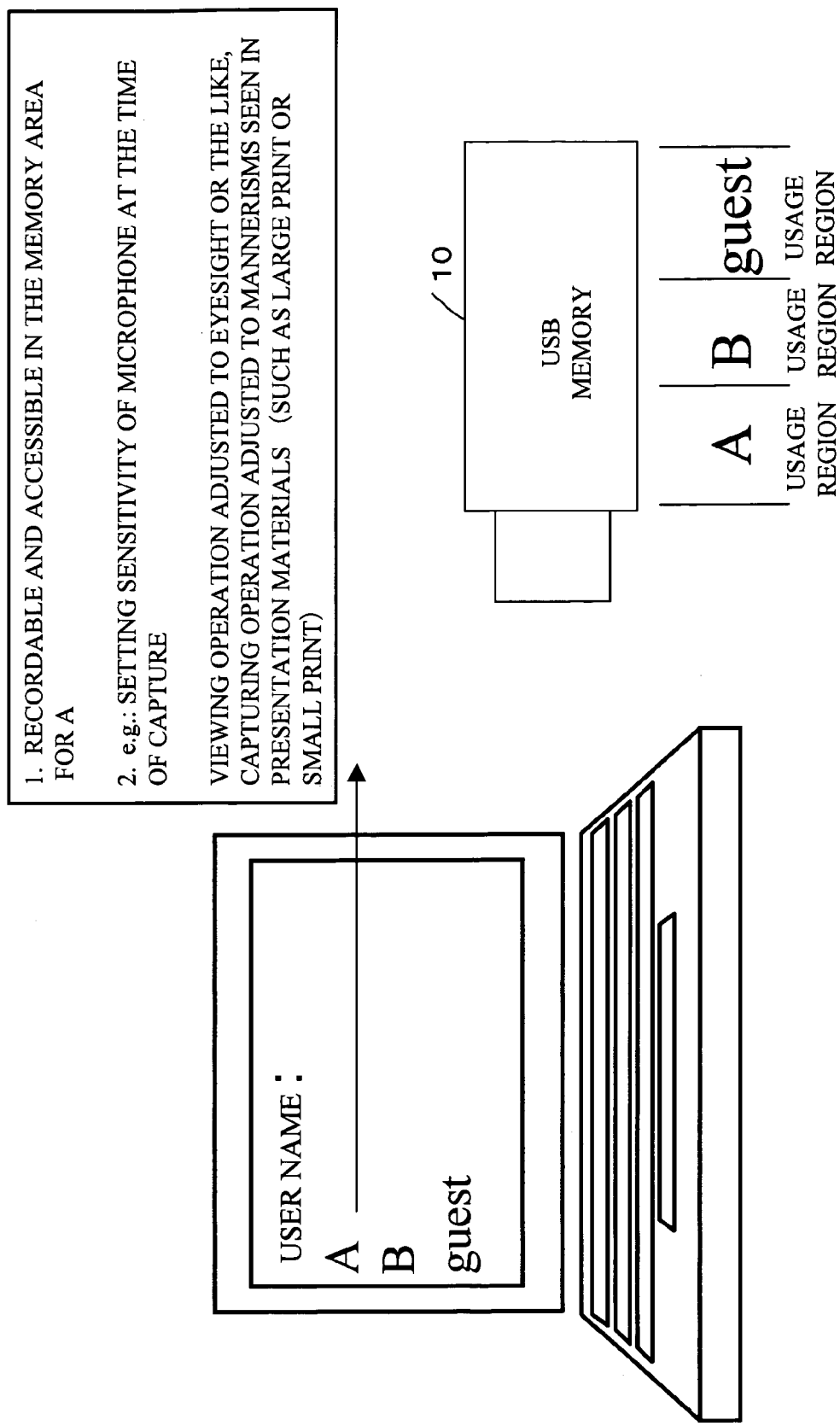
FIG. 31 schematically shows personal environment settings.

FIG. 31 schematically shows the environmental settings for individuals. Work areas for users A and B and a guest are provided in the data region 18 of the USB memory 10.

Referring back to FIG. 30, as the USB memory 10 is inserted to the computer 100 (step S131), the CPU 101 loads the program of the uploading unit 28 shown in FIG. 30 into the memory 102, and starts an operation (step S132). The CPU 101 performs user authentication (step S133), and determines whether the authentication has been properly performed (step S134). If the result of the determination in step S134 indicates "Yes", the CPU 101 moves on to step S135. If the result of the determination in step S134 indicates "No", the CPU 101 moves on to step S138. In step S135, the CPU 101 obtains the right of access set in the data region 18 of the USB memory 10, and detects the performance of the computer 100 (step S136). The CPU 101 reads the parameters suitable for the performance (the machine performance) of the computer 100 and the user from the data region 18 of the USB memory 10 (step S137). If the result of the determination in step S134 indicates "No", the CPU 101 logs in as a guest account (step S138), and detects the performance of the computer 100 (step S139). The CPU 101 then reads the recommended parameters in accordance with the capability of the computer 100 from the data region 18 of the USB memory 10 (step S140).

The setup of parameters and changes of parameters are now described. The configuration parameters are changed in accordance with changes made by users and the usage status of the computer (the usage states of the CPU 101 and the memory 102). Changes to parameters depending on the machine specs are made independently of changes to parameters not depending on the machine specs. When a change is made, the subject value is changed to a value set by a user. In the case of the parameters depending on the specs, the weighting performed on the settings other than the specs (the CPU 101, the memory 102, and the resolution) is changed (with the initial value including the standard value). Through the change in weighting, parameters that are almost the optimum personal parameters can be set for the settings other than the specs. The change in weighting may be performed by a known technique for estimating the collective load of simple perceptron, with the user set value being a teacher signal.

Figures 32, 33:
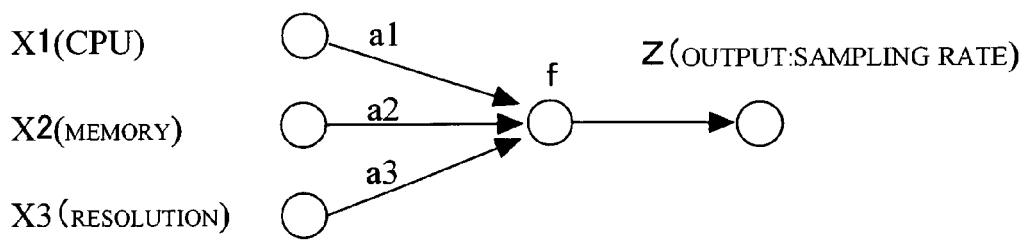
FIG. 32 shows an example of a personal environment setting.
FIG. 33 shows another example of a personal environment setting.

Personal environment setting can be performed, regardless of the performance of the computer 100 to which the USB memory 10 is inserted. FIG. 32 shows an example of this operation. A parameter that is directly changed (/$a_{n+1}$:/ indicating a bar) is set as the next parameter (/$a_{n+1}$=$a_{n+1}$/), or the average of the data obtained so far is set as the parameter (/$a_{n+1}$=(/$a_n$*n+$a_{n+1}$)/(n+1)). On the other hand, personal environment setting can be performed, depending on the performance of the computer 100. FIG. 33 schematically shows such an operation. With parameters X1, X2, and X3 representing the capacity of the CPU 101, the capacity of the memory 102, and the resolution, respectively, the mean square error between those parameter values and the respective teacher signals (the sampling rates changed by a user) is minimized to determine connection weights a1, a2, and a3. Based on the connection weights a1, a2, and a3, the sampling rates for image data and audio data are determined.

Figure 34:
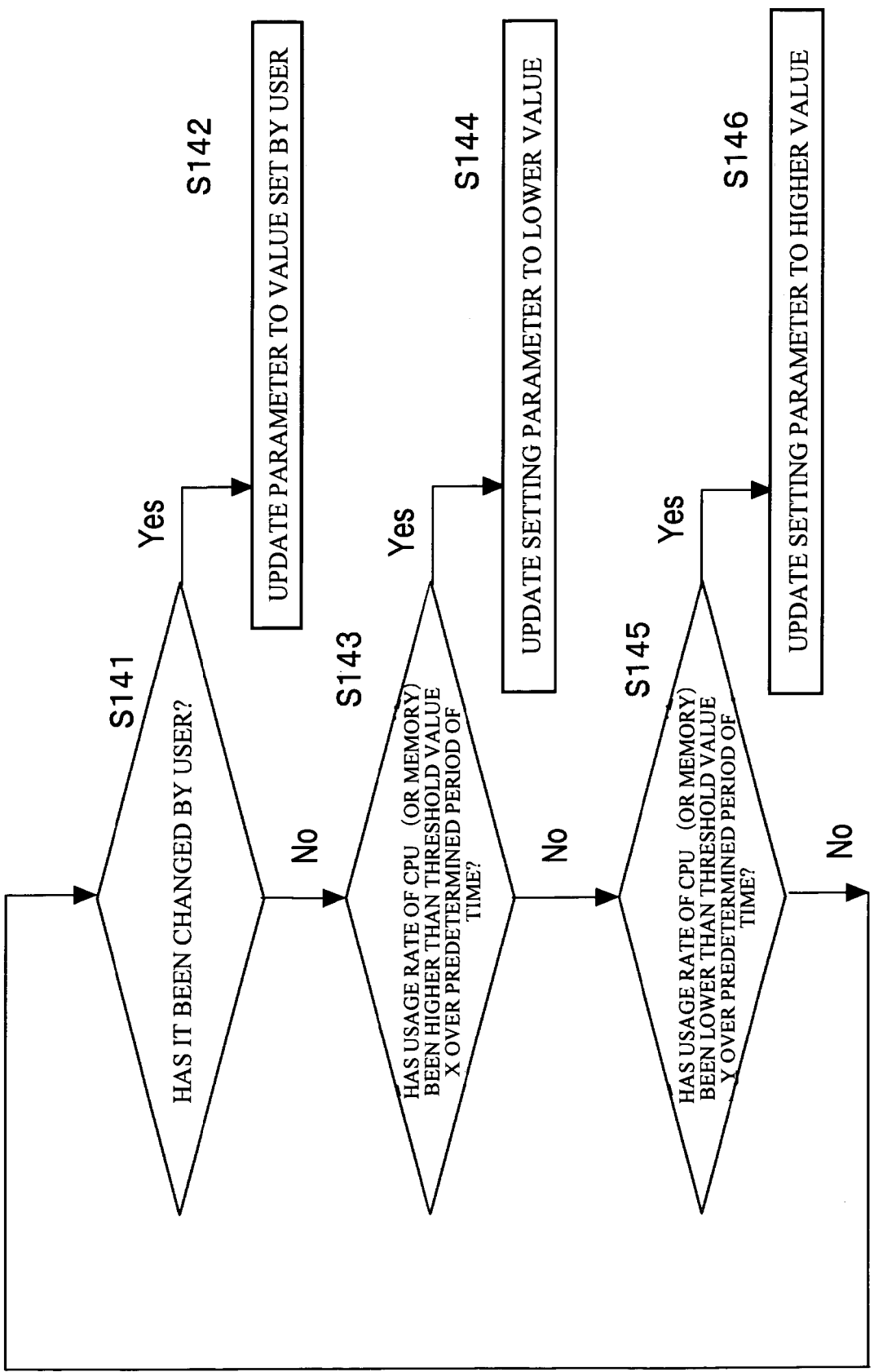
FIG. 34 is a flowchart of a program showing an example of a parameter change in personal environment settings.

FIG. 34 is a flowchart of a program showing an example of a parameter change in personal environment settings. This program is shared among the capturing unit 22, the viewer unit 24, the minutes producing unit 26, and the uploading unit 28 shown in FIG. 2. This program may be provided as part of the program forming each of the units, or may be provided as well as the respective units in the program region 16 shown in FIG. 1. The program shown in FIG. 34 is in constant operation. The CPU 101 determines whether the parameter value has been changed by a user (step S141). If the result of the determination indicates "Yes", the CPU 101 changes the current parameter value to the value set by the user (step S142), and ends the operation. If the result of the determination in step S141 indicates "No", the CPU 101 determines whether the usage rate of the memory 102 has been higher than a threshold value X over a predetermined period of time in accordance with the processing capacity of the CPU 101 if necessary (step S143). If the result of the determination indicates "Yes", the CPU 101 changes the parameter value to a smaller value (step S144). If the result of the determination in step S143 indicates "No", the CPU 101 determines whether the usage rate of the memory 102 has been lower than a threshold value Y over a predetermined period of time in accordance with the processing capacity if necessary (step S145). If the result of the determination indicates "Yes", the CPU 101 changes the parameter value to a larger value (step S146). If the result of the determination in step S145 is "No", the CPU 101 returns to step S141. In this manner, the environmental settings of each user are changed in accordance with the performance and the operation status of the computer 100, so as to provide the optimum environment for users.

Figure 35:
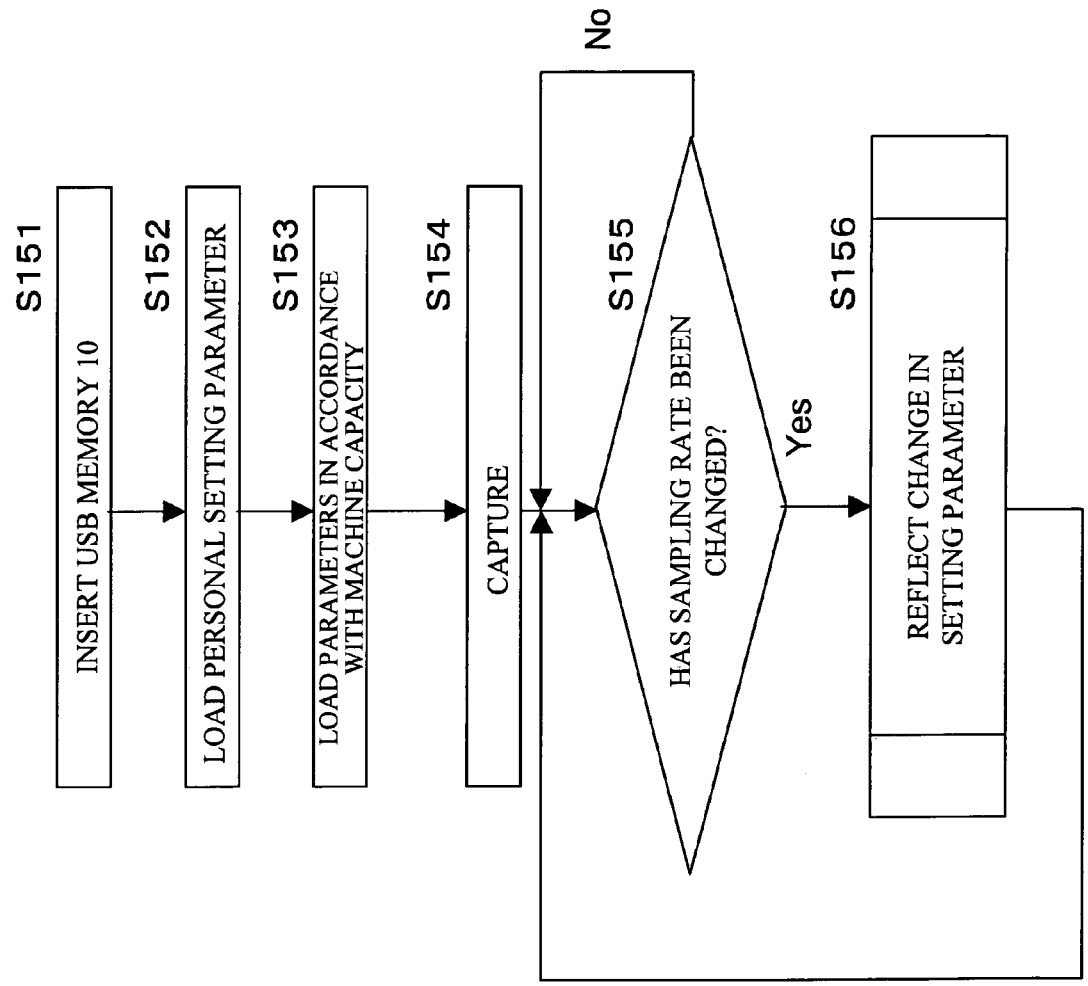
FIG. 35 is a flowchart of another program showing another example of a parameter change (a sampling rate change) in personal environment settings.

FIG. 35 is a flowchart of the program showing another example of a parameter change in personal environment settings (in this example shown in FIG. 35, sampling rates are to be changed). Recommended rates are stored in the data region 18 of the USB memory 10. User can change the rates during a capturing operation. After a change, the influence of the change is reflected not only in the performance and the operation status of the computer 100 but also in the entire rate.

The CPU 101 determines whether the USB memory 10 is inserted to the computer 100 (step S151). The CPU 101 reads personal setting parameters from the data region 18 of the USB memory 10 (step S152), and also reads parameters in accordance with the performance (machine performance) of the computer 100 from the data region 18 (step S153). The CPU 101 starts a capturing operation in accordance with the program of the capturing unit 22 (step S154). The CPU 101 then determines whether a sampling rate is changed by a user during the capturing operation (step S155). The CPU 101 can be notified of the sampling rate by a user operating the operating unit 105. If the result of the determination in step S155 indicates "No", the CPU 101 returns to step S155. If the result of the determination in step S155 indicates "Yes", the CPU 101 changes the current set values of parameters by following the procedures shown in FIG. 34 (step S156). The operation then returns to step S155.

Figure 36B:
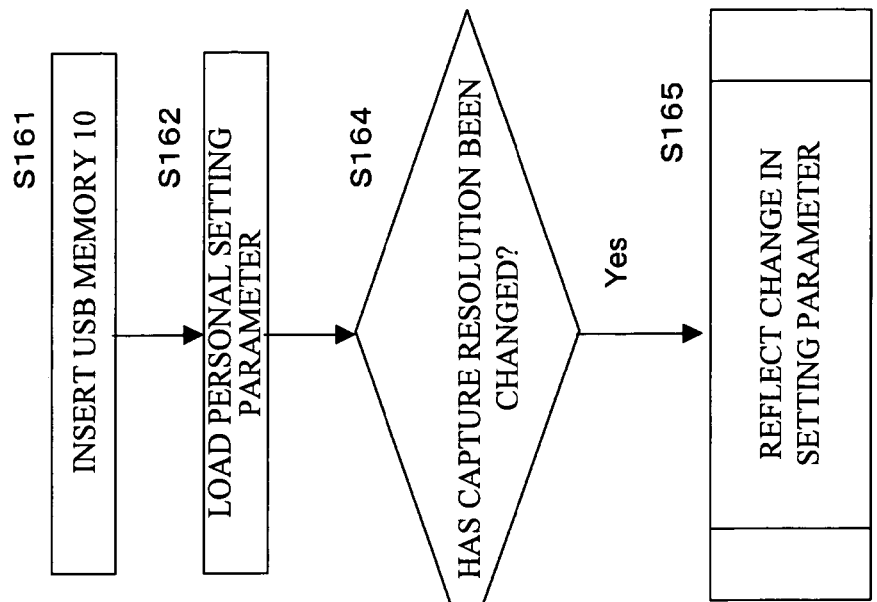
FIGS. 36A and 36B are flowcharts of other examples of parameter changes (changes in resolution) in personal environment settings.
Figure 36A:
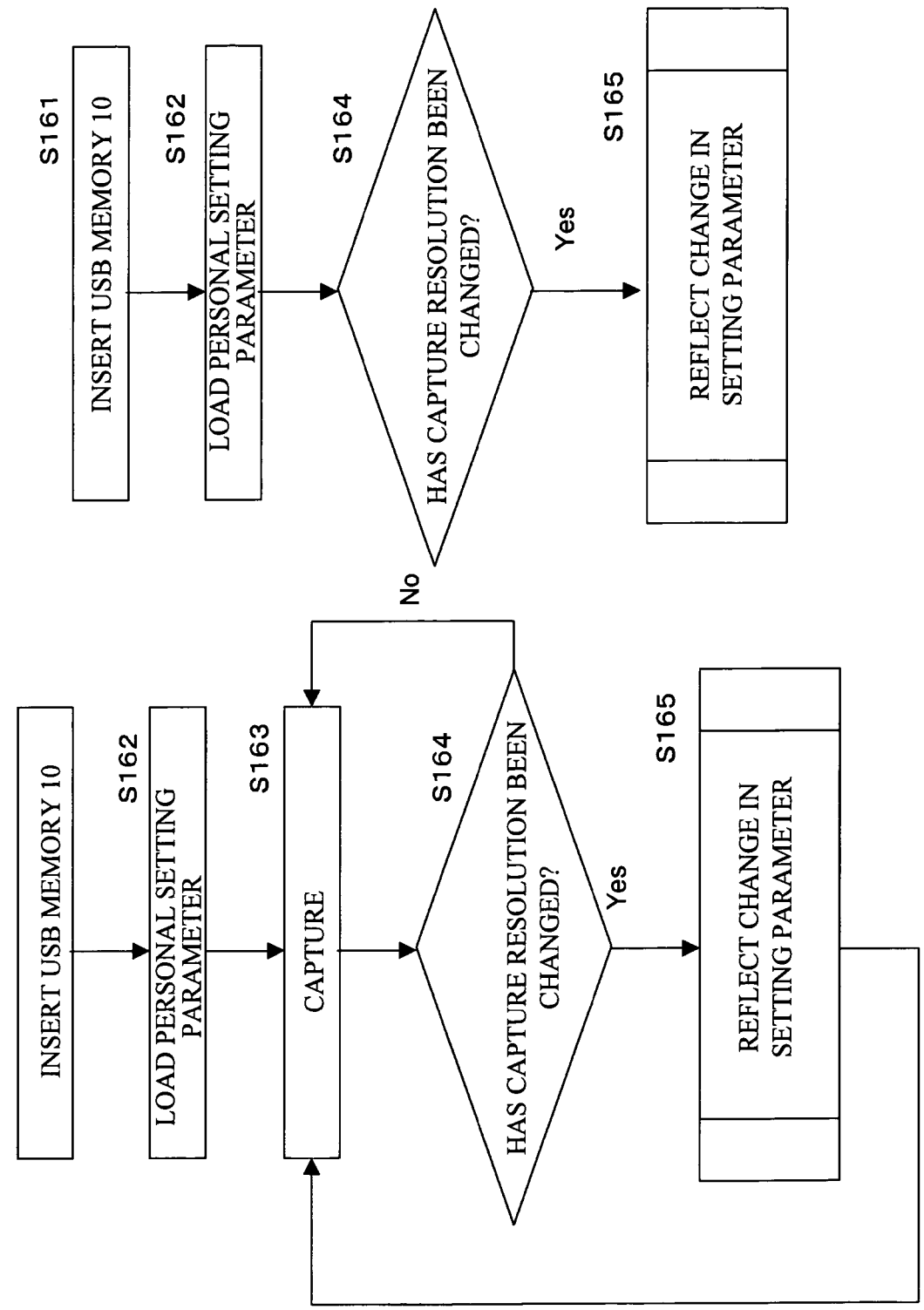

FIGS. 36A and 36B are flowcharts of programs showing yet another example of a parameter change in personal environment settings (a change in resolution). The programs shown in FIGS. 36A and 36B are executed in a case where recommended rates are stored in the data region 18 of the USB memory 10. These programs includes such a sequence that a user can change the capture resolution prior to or after a capturing operation. In FIG. 36A, the CPU 101 determines whether the USB memory 10 is inserted to the computer 100 (step S161), and reads the personal setting parameters from the data region 18 of the USB 10 (step S162). The CPU 101 starts a capturing operation in accordance with the program of the capturing unit 22 (step S163). The CPU 101 then determines whether the capture resolution is changed (step S164). The CPU 101 can be notified of the capture resolution by a user operating the operating unit 105. If the result of the determination in step S164 indicates "No", the CPU 101 returns to step S164. If the result of the determination in step S164 indicates "Yes", the CPU 101 changes the current set values of parameters by following the procedures shown in FIG. 34 (step S165). The operation then returns to step S164. The program shown in FIG. 36B is the same as the program shown in FIG. 36A, except that step S163 is not carried out. The resolution is changed after a capturing operation in the program shown in FIG. 36A, while the resolution is changed prior to a capturing operation in the program shown in FIG. 36B.

Figure 37:
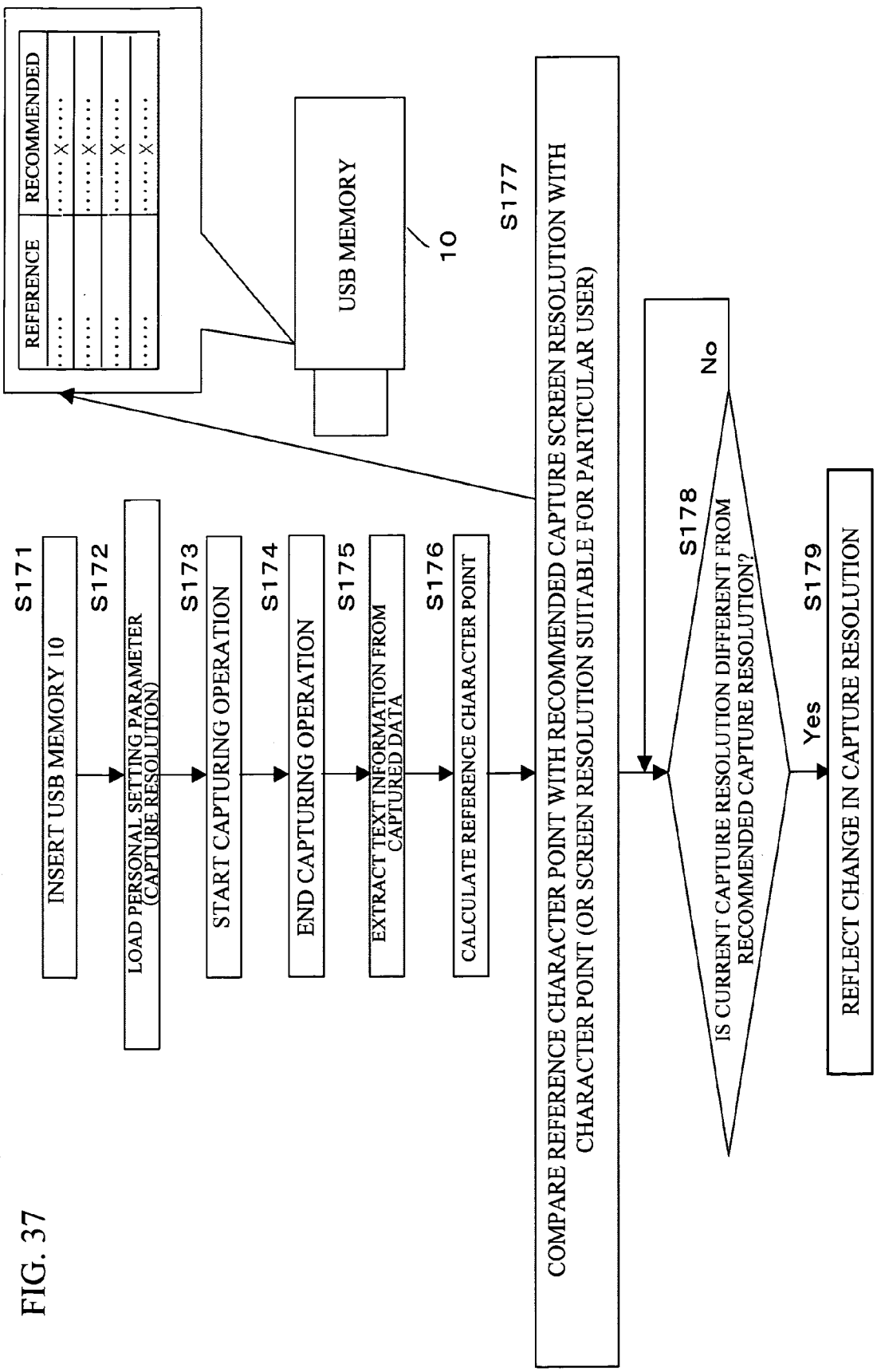
FIG. 37 is a flowchart of a program showing still another example of a parameter change (a change in resolution) in personal environment settings.

FIG. 37 is a flowchart of a program showing still another example of a parameter change in personal environment settings (a change in resolution). In accordance with this program, captured data is analyzed by an OCR operation or the like, and the text information contained in the subject document is detected. Based on the character point (the above described median value, the average value, or the minimum value) in the presentation document detected through the OCR operation (or through special-purpose application monitoring software), the resolution of the captured screen is changed thereafter.

When recognizing that the USB memory 10 is inserted to the computer 100 (step S171), the CPU 101 loads a personal setting parameter (capture resolution) from the USB memory 10 (step S172), and starts a capturing operation (step S173). When the capturing operation ends (step S174), the CPU 101 extracts text information from the captured data (step S175), and calculates the above described reference character point (step S176). The CPU 101 compares the reference character point with the recommended captured screen resolution (or the screen resolution suitable for the individual) represented by a character point (step S177). The CPU 101 then determines whether the current capture resolution differs from the recommended capture resolution (step S178). If not, the CPU 101 returns to step S178. If the current capture resolution differs from the recommended capture resolution, the PCU 101 changes the capture resolution to the recommended capture resolution (or the screen resolution suitable for the individual) (step S179).

Figure 38:
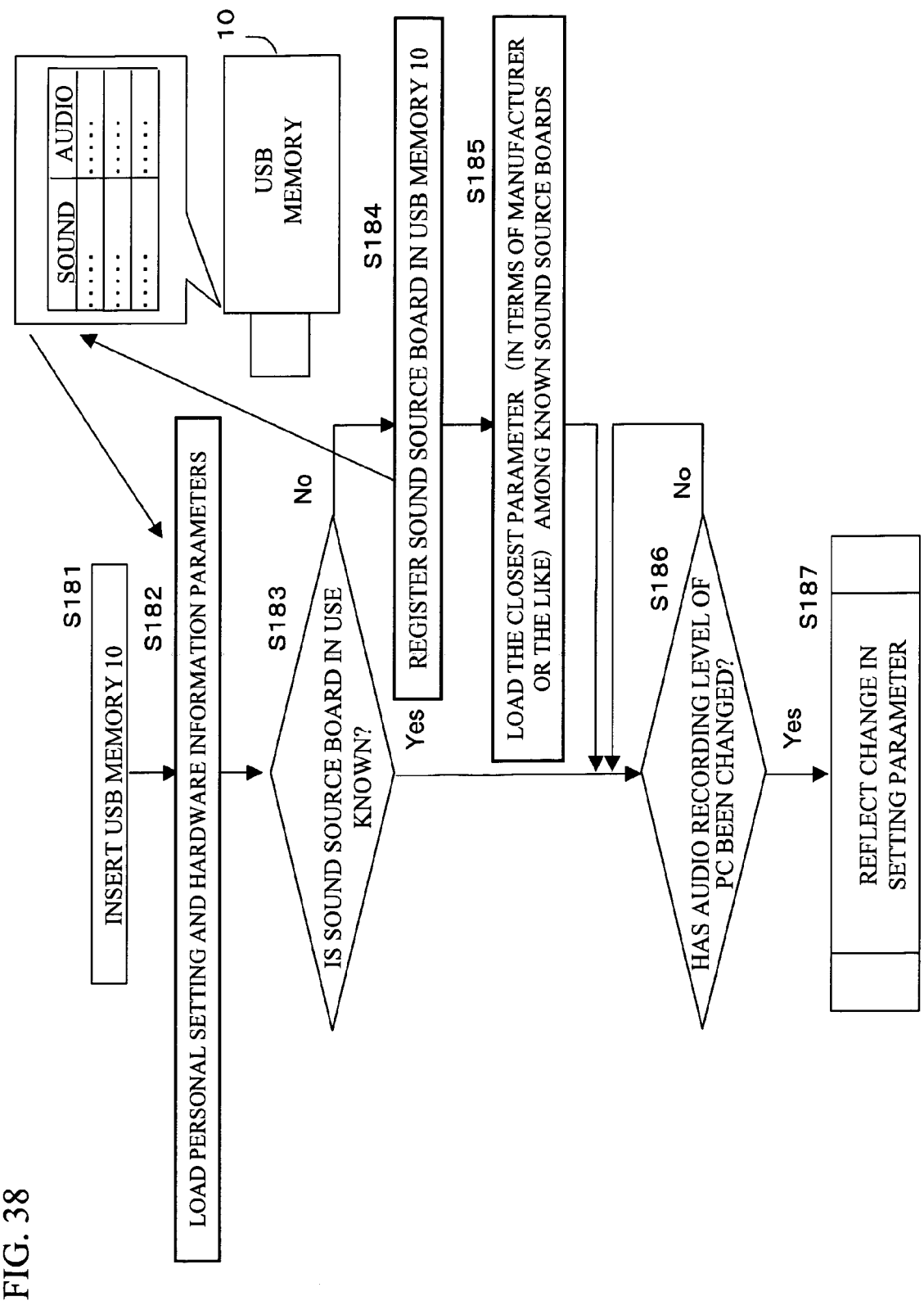
FIG. 38 is a flowchart of a program for setting and changing the audio recording levels among parameter changes in personal environment settings.

FIG. 38 is a flowchart of a program for setting and changing audio recording levels, which is also a parameter change in personal environment settings. The personal setting parameters (or recommended parameters) of each of the sound source boards are loaded into the data region 18 of the USB memory 10. If the sound source board 113 (shown in FIG. 1) of the computer 100 is unknown to the USB memory 10 and the audio recording level of the computer 100 is changed, the parameters are changed accordingly.

The CPU 101 detects the insertion of the USB memory 10 to the computer 100 (step S181), and loads the personal setting parameters and the parameters of the device information (hardware information) from the USB memory 10 (step S182). The device information is stored in the data region 18 of the USB memory 10 through the above described procedures. The CPU 101 determines whether the sound source board 113 is a known sound source (step S183). If not, the CPU 101 registers the sound source board 113 in the data region 18 of the USB memory 10 (step S184). As shown in FIG. 38, a table that defines the relations between known sound source board and recommended audio recording levels is stored in the data region 18 of the USB memory 10. The CPU 101 registers, as the audio recording level of the unknown sound source board, the audio recording level of the known sound source board that is closest to the unknown sound source board, and the audio recording level is loaded into the memory 102 (step S185). After carrying out step S185, or when the result of the determination in step S183 indicates "Yes", the CPU 101 determines whether the audio recording level of the computer 100 has been changed (step S186). If the result of the determination indicates "No", the CPU 101 repeats step S186. If the result of the determination indicates "Yes", the CPU 101 changes the setting values of the parameters (step S187).

Figure 39:
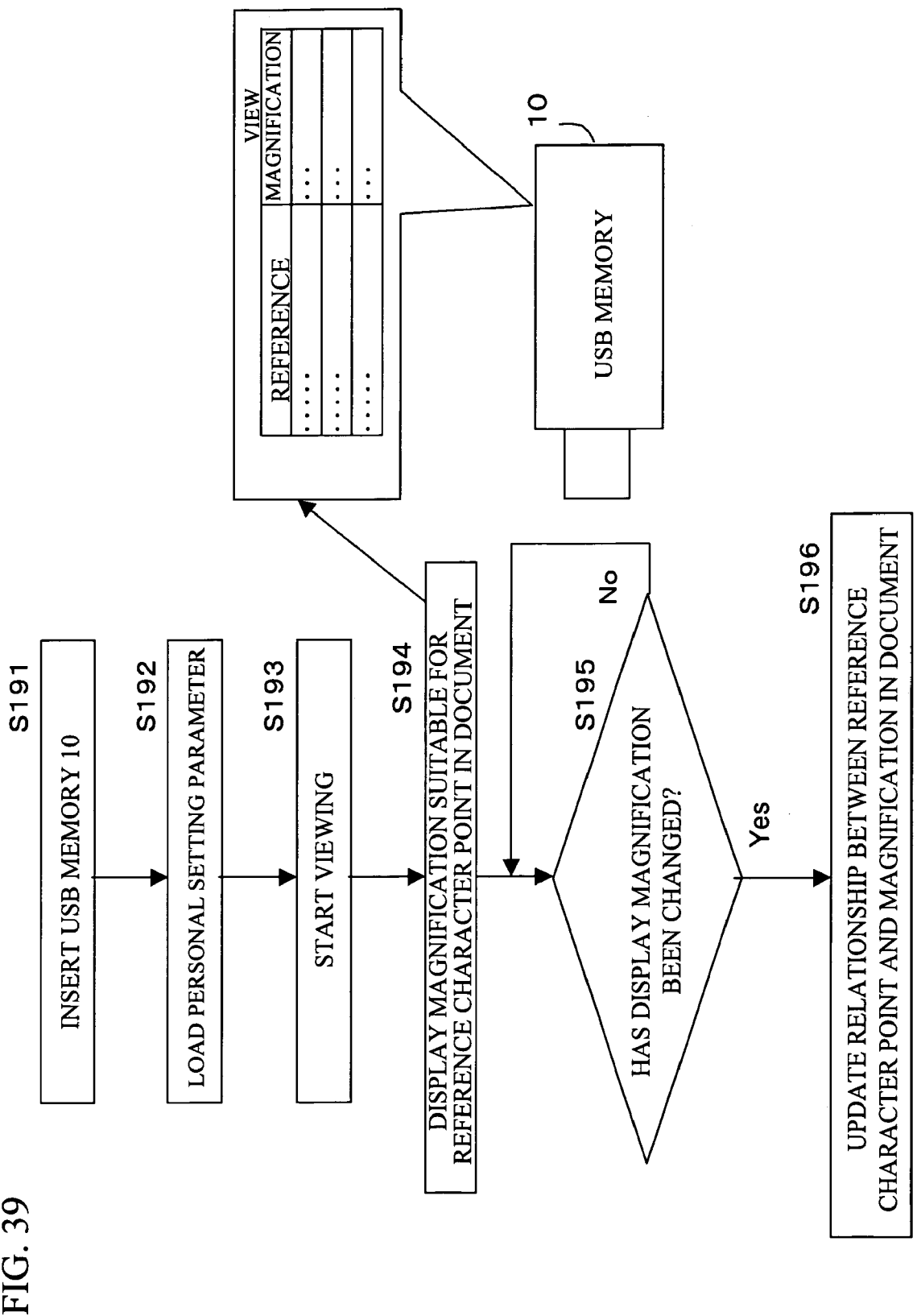
FIG. 39 is a flowchart of a program for setting and changing display magnifications (viewer magnifications) at the time of viewing among the parameter changes in personal environment settings.

FIG. 39 is a flowchart of a program for setting and changing the display magnification-(viewer magnification) at the time of viewing among parameters changes in personal environment settings. In a case where a user changes the display magnification in a viewing operation, the display magnification is changed thereafter in accordance with the reference character point (the minimum value, the average value, or the most frequent value) in the changed document.

When recognizing the insertion of the USB memory 10 to the computer 100 (step S191), the CPU 101 loads the personal setting parameters (display magnifications) from the USB memory 10 (step S192), and starts a viewing operation (step S193). The CPU 101 displays a screen at the display magnification in accordance with the reference character point in the subject document. As described above, the table showing the relations between the reference character point and the viewer magnifications (display magnifications) is stored in the data region 18 of the USB memory 10. The CPU 101 then determines whether the display magnification has been changed (step S195). In a case where the display magnification has been changed by a user, the CPU 101 updates the relations between the reference character point and the display magnifications in the document, and changes the display magnification to the value according to an instruction from the user (step S196).

The embodiments of the present invention have been described so far. In the above described embodiments, when data is stored in the data region 18 of the USB memory 10, the data may be encrypted. The encrypted data is uploaded onto the server 30. To view the encrypted data, a user accesses the server 30, and decrypts the data with the use of a predetermined key ("search" in FIG. 2). The encrypted data may be transmitted not only to the server 30 but also to another computer. In the computer to which the encrypted data is transferred, the data is decrypted with the use of a certificate or the ID unique to the machine, so that the data can be viewed. Further, as shown in FIG. 2, data distribution from the server 30 may be performed.

As described above, with the structure in which the program of the capturing unit 22 for causing a computer to perform the operation of acquiring conference information such as image data and audio data relating to the subject conference and storing the conference data is stored in a detachable memory such as the USB memory 10, an environment in which a special-purpose device or a particular application is installed in the computer is not necessary, and the conference information can be captured at low costs.

Also, since the program of the viewer unit 24 for causing a computer to perform the operation of displaying conference information stored in a detachable memory such as the USB memory 10 on the computer is stored in the detachable memory, an environment in which a special-purpose device or a particular application is installed in the computer is not necessary, and the detachable memory can be used as an inexpensive personal IC recorder provided with a visual chapter list.

Also, since the program of the minutes producing unit 26 for causing a computer to perform the operation of generating minutes based on conference information stored in a detachable memory such as the USB memory 10 and storing the minutes in the detachable memory is stored in the detachable memory, an environment in which a special-purpose device or a particular application is installed in the computer is not necessary, and the minutes can be produced with the use of a given computer.

Also, since the program of the uploading unit 28 for causing a computer to perform the operation of transmitting conference information or minutes stored in a detachable memory such as the USB memory 10 to the outside is stored in the detachable memory, an environment in which a special-purpose device or a particular application is installed in the computer is not necessary, and data can be readily uploaded onto a desired computer with the use of a given terminal.

Also, since the program for causing a computer to perform the operation of acquiring the information as to either the capability or the operation status of the computer to which a detachable memory such as the USB memory 10 is connected and storing the acquired information in the detachable memory, and the operation of controlling at least one of the capturing unit 22, the viewer unit 24, the minutes producing unit 26, and the uploading unit 28 so as to achieve a suitable load in accordance with the capability and the operation status of the computer based on the acquired information, is stored in the detachable memory, an environment in which a special-purpose device or a particular application is installed in the computer is not necessary, and the optimum functions for the capability and the usage status of the computer to which the detachable memory is connected can be provided.

Also, since the program for causing a computer to perform the operation of referring to the environment information of each user stored in a detachable memory such as the USB memory 10 and the operation of controlling at least one of the capturing unit 22, the viewer unit 24, the minutes producing unit 26, and the uploading unit 28 so as to provide an environment in accordance with the environment information, is stored in the detachable memory, an environment in which a special-purpose device or a particular application is installed in the computer is not necessary, and the optimum environment can be provided for each user.

A computer control program employed as an aspect of the present invention is realized with a Central Processing Unit (CPU), Read Only Memory (ROM), Random Access Memory (RAM), and the like, by installing a program from a portable memory device or a storage device such as a hard disc device, CD-ROM, DVD, or a flexible disc or downloading the program through a communications line. Then the steps of program are executed as the CPU operates the program.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An electronic device that is connected to an external interface of a computer and has a memory unit that stores a program to be executed by the computer and data,
the program comprising:
    a first operating unit that causes the computer to perform an operation of acquiring conference information containing at least one of image data and audio data as to a conference and storing the conference information in a predetermined memory area, and
    a second operating unit that, once the computer detects connection of the electronic device to the computer, causes the computer to perform operations of:
        detecting a device, other than the electronic device, that is connected to the computer or that is built in the computer,
        obtaining device information regarding the device and storing the device information in the predetermined memory area of the electronic device,
        obtaining information as to at least one of the performance and the operation status of the computer and storing the information in the predetermined memory area of the electronic device, and
        controlling any one of the first operating unit and another operating unit so as to apply a load to the computer in accordance with the device information, and said at least one of the performance and the operation status of the computer stored in the predetermined memory area of the electronic device.

2. The electronic device as claimed in claim 1, wherein the first operating unit associates the image data with the audio data, and stores the image data and the audio data together with time stamp information in the predetermined memory area.

3. The electronic device as claimed in claim 2, wherein the program further comprises a third operation unit that causes the computer to perform an operation of displaying the conference information stored in the predetermined memory area onto the computer.

4. The electronic device as claimed in claim 3, wherein the program further comprises a fourth operating unit that causes the computer to perform an operation of generating minutes information forming minutes based on the conference information and storing the minutes information in the predetermined memory area, the minutes are a record of the conference.

5. The electronic device as claimed in claim 4, wherein the program further comprises a fifth operating unit that causes the computer to perform an operation of transmitting at least one of the conference information and the minutes information to outside of the memory unit.

6. The electronic device as claimed in claim 5, wherein the program further comprises a sixth operating unit that causes the computer to perform an operation of referring to environment information of each user stored in the predetermined memory area and controlling at least one of the first and third through fifth operating units so as to perform an operation in accordance with the environment information.

7. The electronic device as claimed in claim 1, wherein the program is automatically activated when the electronic device is connected to the computer.

8. The electronic device as claimed in claim 1, wherein the electronic device is detachable from the computer.

9. The electronic device as claimed in claim 1, wherein the information as to at least one of the performance and the operation status of the computer to which the electronic device is connected is information as to at least one of the performance and the usage status of a central processing unit in the computer and the usage status of the predetermined memory area.

10. The electronic device as claimed in claim 1, wherein the second operating unit refers to at least one of a sampling rate at which the conference information is acquired and a parameter for displaying the conference information, the sampling rate and the parameter being stored beforehand in the predetermined memory area, the second operating unit acquiring the information as to at least one of the performance and the operation status of the computer to which the electronic device is connected, the second operating unit comparing the information with the sampling rate and the parameter stored beforehand in the predetermined memory area, the second operating unit changing at least one of the sampling rate at which the conference information is acquired and the parameter for displaying the conference information.

11. The electronic device as claimed in claim 6, wherein the sixth operating unit compares environment information as to a user designated from the outside with at least one of a sampling rate at which the conference information is acquired and a parameter for displaying the conference information, the sampling rate and the parameter being stored beforehand as environment information as to each user in the predetermined memory area, the sixth operating unit changing at least one of the sampling rate at which the conference information is acquired and the parameter for displaying the conference information.

12. The electronic device as claimed in claim 6, wherein the sixth operating unit refers to at least one of history information as to a sampling rate at which the conference information is acquired and history information as to a parameter for displaying the conference information, the history information being stored beforehand as environment information as to each user in the predetermined memory area, the sixth operating unit changing at least one of the sampling rate at which the conference information is acquired and the parameter for displaying the conference information.

13. A non-transitory computer readable medium storing a program causing a computer to:
  detect connection of the non-transitory computer readable medium to the computer,
  acquire conference information containing at least one of image data and audio data as to a conference and store the conference information in a predetermined memory area of the non-transitory computer readable medium, and
to perform operations of:
  detecting a device, other than the non-transitory computer readable medium, that is connected to the computer or that is built in the computer,
  obtaining device information regarding the device and storing the device information in the predetermined memory area of the non-transitory computer readable medium,
  obtaining information as to at least one of the performance and the operation status of the computer and storing the information in the predetermined memory area of the non-transitory computer readable medium, and
  controlling any one of (i) acquiring conference information and (ii) another operation so as to apply a load to the computer in accordance with the device information, and said at least one of the performance and the operation status of the computer stored in the predetermined memory area of the non-transitory computer readable medium.

* * * * *